United States Patent
Inoue et al.

(10) Patent No.: US 7,980,346 B2
(45) Date of Patent: Jul. 19, 2011

(54) VEHICLE CONTROL DEVICE

(75) Inventors: Gen Inoue, Susono (JP); Yasuhito Ishida, Toyokawa (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 433 days.

(21) Appl. No.: 12/216,414

(22) Filed: Jul. 3, 2008

(65) Prior Publication Data

US 2009/0025996 A1    Jan. 29, 2009

(30) Foreign Application Priority Data

Jul. 4, 2007 (JP) ................................. 2007-176554

(51) Int. Cl.
*B60K 31/00* (2006.01)

(52) U.S. Cl. ........................................ 180/170; 180/169

(58) Field of Classification Search ............... 180/65.26, 180/65.27, 62.28, 65.265, 170, 168, 169, 180/197, 179; 903/903, 919, 947; 701/93, 701/96, 70
See application file for complete search history.

(56) References Cited

U.S. PATENT DOCUMENTS

| | | | |
|---|---|---|---|
| 5,731,977 A * | 3/1998 | Taniguchi et al. | 701/96 |
| 6,290,012 B1 * | 9/2001 | Matsubara et al. | 180/65.26 |
| 6,494,282 B1 * | 12/2002 | Hessmert et al. | 180/197 |
| 6,740,987 B2 * | 5/2004 | Kitajima et al. | 180/65.26 |
| 6,843,754 B2 * | 1/2005 | Mori et al. | 477/92 |
| 7,578,364 B2 * | 8/2009 | Ohno | 180/65.28 |
| 7,813,859 B2 * | 10/2010 | Aizawa et al. | 701/70 |
| 2004/0129470 A1 * | 7/2004 | Huelser et al. | 180/170 |
| 2007/0150158 A1 * | 6/2007 | Inoue et al. | 701/93 |

FOREIGN PATENT DOCUMENTS

| | | |
|---|---|---|
| JP | A-2004-90679 | 3/2004 |
| WO | WO 2007/141631 A2 | 12/2007 |

OTHER PUBLICATIONS

U.S. Appl. No. 12/223,579, filed Aug. 4, 2008, in the name of Gen Inoue et al.

* cited by examiner

*Primary Examiner* — Hau V Phan
(74) *Attorney, Agent, or Firm* — Oliff & Berridge, PLC

(57) ABSTRACT

An electronic control device reduces, after a time at which constant speed traveling control is terminated (specific control termination time) not by an accelerating operation or braking operation but by, for example, an operation of a control switch, the vehicle driving force to a force corresponding to the amount of accelerating operation at the specific control termination time. Also, the electronic control device changes the vehicle braking force to a force corresponding to the amount of braking operation at the specific control termination time by controlling the braking hydraulic pressures with a hydraulic pressure circuit so that the value of a vehicle propulsive force, which takes a positive value when acting in the same direction as the driving force (and takes a negative value when acting in the opposite direction of the driving force) and which has a magnitude equal to a value resulting from subtracting the magnitude of the braking force from the magnitude of the driving force, is equal to or smaller than the value of the vehicle propulsive force at the specific control termination time.

22 Claims, 13 Drawing Sheets

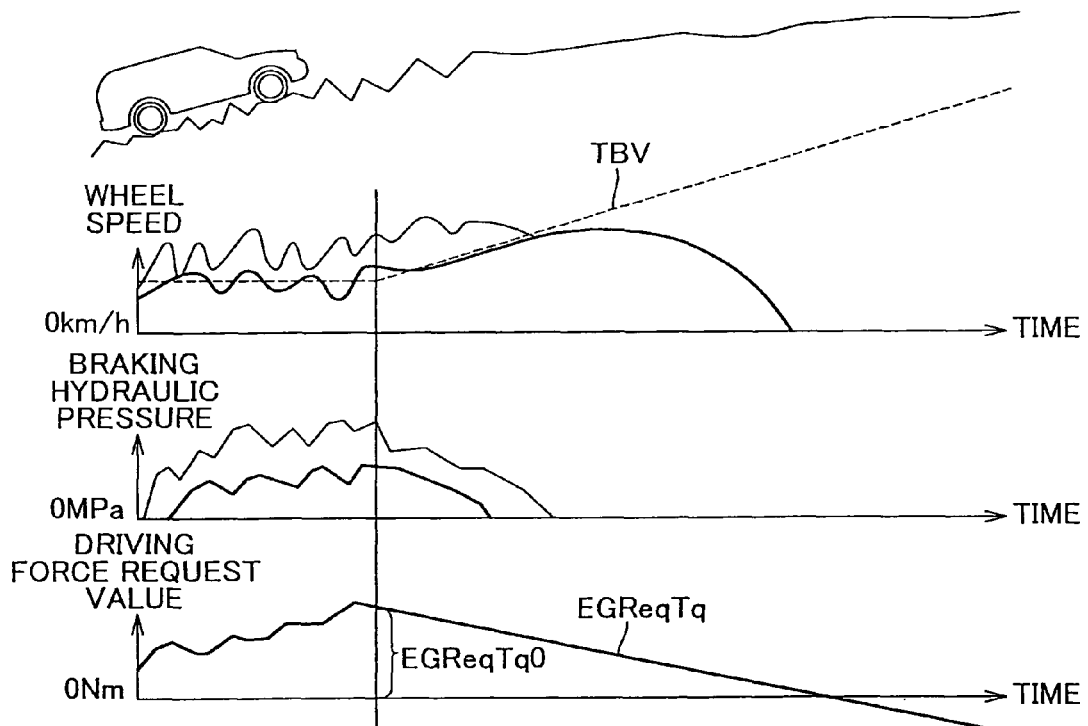
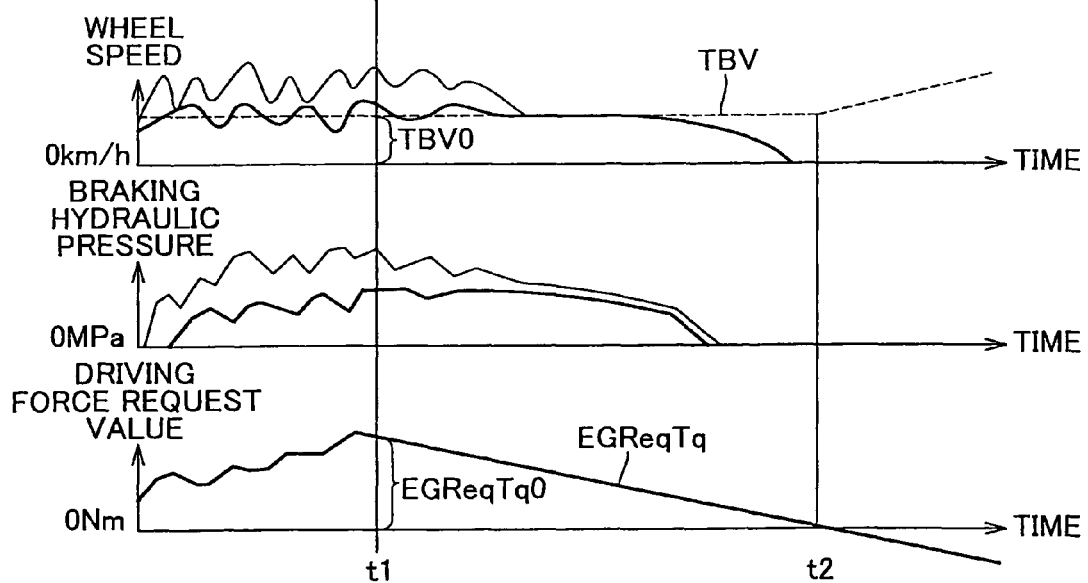

F I G . 12A
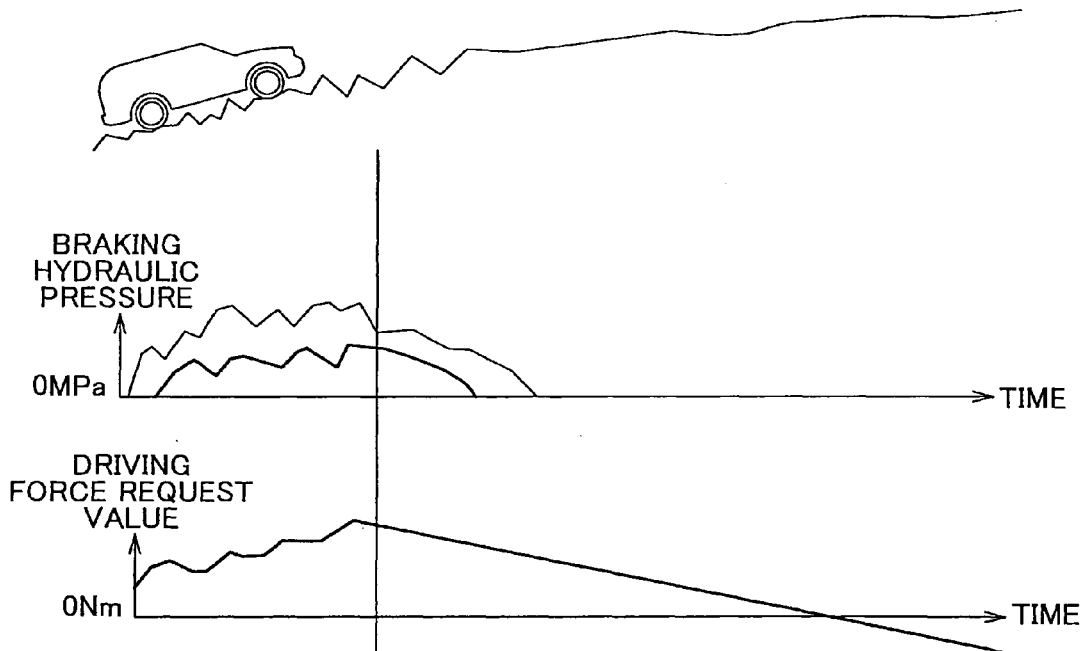
F I G . 12B
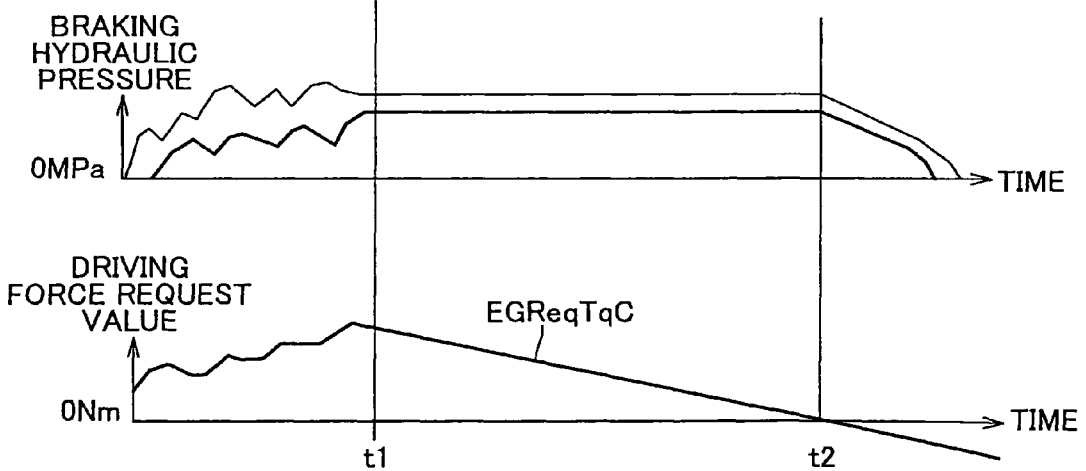

VEHICLE CONTROL DEVICE

INCORPORATION BY REFERENCE

The disclosure of Japanese Patent Application No. 2007-176554 filed on Jul. 4, 2007 including the specification, drawings and abstract is incorporated herein by reference in its entirety.

BACKGROUND OF THE INVENTION

1. Field of the Invention

The present invention relates to a vehicle control device that controls the vehicle driving force and vehicle braking force to be applied to a vehicle to maintain the vehicle body speed (vehicle speed) at a target vehicle speed.

2. Description of the Related Art

There have been previously proposed vehicle control devices (also referred to as constant speed traveling control devices or automatic traveling control devices) for controlling the vehicle driving force and vehicle braking force to be applied to a vehicle to maintain the vehicle speed at a relatively low target vehicle speed of, for example, about several kilometers per hour to a dozen kilometers per hour (at as low a target vehicle speed as the creep speed) (see Japanese Patent Application Publication No. 2004-90679 (JP-A-2004-90679), for example). Such control is also referred to as "constant speed traveling control." Since such a control device changes not only the vehicle driving force but also the vehicle braking force to control the vehicle speed, the control device can control the vehicle speed quickly and accurately as compared to the case in which only the vehicle driving force is changed. As a result, the control device can make the vehicle speed accurately equal to the target vehicle speed even when the vehicle is traveling on a steep grade (uphill or downhill grade).

The control device of the related art changes the vehicle driving force toward a vehicle driving force corresponding to the amount of accelerating operation (for example, the accelerator displacement) and changes the vehicle braking force toward a vehicle braking force corresponding to the amount of braking operation (for example, brake pedal depression amount) after the constant speed traveling control is terminated. Such a control device may have a switch for constant speed traveling control, and may be configured to perform the constant speed traveling control when the switch for constant speed traveling control is on and terminate the constant speed traveling control when the switch for constant speed traveling control is turned off. Thus, the control device constituted as described above reduces the vehicle driving force toward "0" at a predetermined driving force reduction rate and reduces the vehicle braking force toward "0" at a predetermined braking force reduction rate when the switch is operated and termination conditions of the constant speed traveling control are satisfied while neither an accelerating operation nor a braking operation is performed.

However, when the control device reduces the vehicle driving force and the vehicle braking force toward "0," the control device does not associate the vehicle driving force and the vehicle braking force with each other. In other words, the driving force reduction rate of the vehicle driving force and the braking force reduction rate of the vehicle braking force are independent of and different from each other. Therefore, the control device may cause the vehicle to accelerate or decelerate while the vehicle driving force and the vehicle braking force are decreasing toward "0" after the termination of constant speed traveling control as described below and, consequently, give the driver discomfort.

For example, when the switch is operated and termination conditions of the constant speed traveling control are satisfied during constant speed traveling control, and when the vehicle braking force decreases more quickly than the vehicle driving force, the vehicle driving force becomes excessive relative to the vehicle braking force. As a result, since the vehicle accelerates even when the vehicle is traveling on an uphill grade, the driver may feel discomfort. Also, when the switch is operated and the termination conditions of the constant speed traveling control are satisfied during constant speed traveling control, and when the vehicle driving force decreases more quickly than the vehicle braking force, the vehicle braking force becomes excessive relative to the vehicle driving force. As a result, since the vehicle decelerates even when the vehicle is traveling on a downhill grade, the driver may feel discomfort. Such a situation occurs not only after constant speed traveling control is terminated by an operation of the switch for constant speed traveling control but also after constant speed traveling control is terminated because some part of the control device is determined not to be working properly, for example.

SUMMARY OF THE INVENTION

A vehicle control device according to one aspect of the present invention is applied to a vehicle equipped with a driving source (such as an internal combustion engine or electric motor) that produces a force corresponding to a driving force request value so as to apply a vehicle driving force to the vehicle to increase the vehicle speed, and a brake system that produces a force corresponding to a braking force control amount so as to apply a vehicle braking force to the vehicle to reduce the vehicle speed. In this case, the "braking force control amount" is a parameter, which is used to control the braking forces of the brake system, such as the braking hydraulic pressures, in the case of a hydraulic pressure brake system, or a parameter, which is used to control the braking forces of the brake system, such as the control voltage, control current or control signal, in the case of an electric brake system, for example.

The vehicle control device according to an aspect of the present invention also includes: a first driving force request value generation device; a second driving force request value generation device; a first braking force control amount generation device; a second braking force control amount generation device; and a vehicle propulsive force control device.

The first driving force request value generation device generates a first driving force request value based on an accelerating operation amount which is varied by an accelerating operation of the driver. In this case, "the amount of accelerating operation which is varied by an accelerating operation of the driver" is a parameter indicating the degree of intention of the driver to increase the vehicle speed such as the accelerator pedal displacement.

The second driving force request value generation device generates a second driving force request value based on a value corresponding to the actual vehicle speed and a value corresponding to a predetermined target vehicle speed so that the actual vehicle speed is equal to the target vehicle speed. In this case, "the predetermined target vehicle speed" may be a vehicle speed selected by the driver from target vehicle speeds determined in advance, or a vehicle speed which is automatically set based on the running environments such as the tilt of the road, road surface conditions and the distance to a preceding vehicle, for example. Also, in this case, "the value corresponding to the target vehicle speed" may be exactly the same as the target vehicle speed, or may be a vehicle speed resulting from adding a predetermined vehicle speed to the target vehicle speed or a vehicle speed resulting from subtracting a predetermined vehicle speed from the target vehicle speed, for example.

The first braking force control amount generation device generates a first braking force control amount based on a braking operation amount which is varied by a braking operation of the driver. In this case, "the amount of braking operation which is varied by a braking operation of the driver" is a parameter indicating the degree of intention of the driver to reduce the vehicle speed such as the brake pedal displacement or the brake pedal depressing force.

The second braking force control amount generation device generates a second braking force control amount based on a value corresponding to the actual vehicle speed and a value corresponding to the target vehicle speed so that the actual vehicle speed is equal to the target vehicle speed. In this case, "the value corresponding to the target vehicle speed" is a parameter indicating a speed as an object of control of the brake system, such as a target wheel speed determined based on the target vehicle speed, for example.

The vehicle propulsive force control device causes the driving source to produce a force corresponding to the second driving force request value and causes the brake system to produce a force corresponding to the second braking force control amount when constant speed traveling control conditions necessary to make the actual vehicle speed equal to the target vehicle speed are satisfied, and causes the driving source to produce a force corresponding to the first driving force request value and causes the brake system to produce a force corresponding to the first braking force control amount when the constant speed traveling control conditions are not satisfied. Therefore, when the constant speed traveling control is not satisfied, settings are adjusted so that the vehicle driving force and the vehicle braking force are equal to the vehicle driving force corresponding to the first driving force request value and the vehicle braking force corresponding to the first braking force control amount, respectively. Also, when the constant speed traveling control is satisfied, settings are adjusted so that the vehicle driving force and the vehicle braking force are equal to the vehicle driving force corresponding to the second driving force request value and the vehicle braking force corresponding to the second braking force control amount, respectively.

In addition, the vehicle propulsive force control device has a first control termination time control device and a second control termination time control device.

When a "specific control termination time" at which the constant speed traveling control conditions are changed from satisfied state to unsatisfied state comes while neither the accelerating operation nor the braking operation are performed, the first control termination time control device changes a first force, which is the greater of the vehicle driving force and the vehicle braking force at the specific control termination time, toward one of a vehicle driving force resulting from a force that the driving source produces in accordance with the first driving force request value and a vehicle braking force resulting from a force that the brake system produces in accordance with the first braking force control amount that corresponds to the first force after the specific control termination time. In other words, the first control termination time control device changes a first force, which is the greater of the vehicle driving force and the vehicle braking force, preferentially to a second force, which is the smaller of the vehicle driving force and the vehicle braking force.

The second control termination time control device changes a second force, which is the smaller of the vehicle driving force and the vehicle braking force, toward one of a vehicle driving force resulting from a force that the driving source produces in accordance with the first driving force request value and a vehicle braking force resulting from a force that the brake system produces in accordance with the first braking force control amount that corresponds to the second force after the specific control termination time so that the value of a "vehicle propulsive force," which takes a positive value when acting in the same direction as the first force and takes a negative value when acting in the opposite direction of the first force and which has a magnitude equal to the value resulting from subtracting the magnitude of the second force from the magnitude of the first force, is equal to or smaller than the value of "the vehicle propulsive force" at the specific control termination time. In this case, "the vehicle propulsive force" is the sum of the vehicle driving force and the vehicle braking force that the driving source and the brake system produce on the vehicle and does not include any forces from the external environment such as the gravitational force.

The vehicle control device with the above configuration operates as follows. For example, when the vehicle travels on an uphill grade during constant speed traveling control, the vehicle driving force usually becomes greater than the vehicle braking force. If the specific control termination time comes in this state, the greater of the vehicle driving force and the vehicle braking force at the specific control termination time is the vehicle driving force. Thus, after the specific control termination time, the vehicle driving force (i.e., the first force, which is greater of the two forces) is changed to a vehicle driving force resulting from the force corresponding to the first driving force request value which the driving source produces.

In this case, the vehicle braking force (i.e., the second force) is changed to a vehicle braking force resulting from the force corresponding to the first braking force control amount which the brake system produces so that the value of a "vehicle propulsive force," which takes a positive value when acting in the same direction as the vehicle driving force and takes a negative value when acting in the opposite direction of the vehicle driving force (in the same direction as the vehicle braking force) and which has a magnitude equal to the value resulting from subtracting the magnitude of the vehicle braking force from the magnitude of the vehicle driving force, is equal to or smaller than "the value of the vehicle propulsive force at the specific control termination time." In other words, the vehicle braking force is gradually changed so that the "vehicle propulsive force" in the same direction as the vehicle driving force after the specific control termination time does not exceed the "vehicle propulsive force" in the same direction as the vehicle driving force at the specific control termination time.

As a result, a situation does not occur in which the vehicle accelerates even though the driver is not performing an accelerating operation when, for example, the vehicle is traveling on an uphill grade and after the specific control termination time, and the driver does not feel any discomfort.

Also, for example, when the vehicle travels on a downhill grade during constant speed traveling control, the vehicle braking force usually becomes greater than the vehicle driving force. If the specific control termination time comes in this state, the greater of the vehicle driving force and the vehicle braking force at the specific control termination time is the vehicle braking force. Thus, after the specific control termination time, the vehicle braking force (i.e., the first force, which is greater of the two forces) is changed to a vehicle braking force resulting from that force corresponding to the first braking force control amount which the driving source produces.

In this case, the vehicle driving force (i.e., the second force) is changed to a vehicle driving force resulting from the force corresponding to the first driving force control amount which the driving source generates so that the value of a "vehicle propulsive force," which takes a positive value when acting in the same direction as the vehicle braking force and takes a negative value when acting in the opposite direction of the vehicle braking force (in the same direction as the vehicle driving force) and which has a magnitude equal to the value resulting from subtracting the magnitude of the vehicle driving force from the magnitude of the vehicle braking force, is equal to or smaller than "the value of the vehicle propulsive force at the specific control termination time." In other words, the vehicle driving force is gradually changed so that the "vehicle propulsive force" in the same direction as the vehicle braking force after the specific control termination time does not exceed the "vehicle propulsive force" in the same direction as the vehicle braking force at the specific control termination time.

As a result, a situation does not occur in which the vehicle decelerates even though the driver is not performing a braking operation when, for example, the vehicle is traveling on a downhill grade and after the specific control termination time, and the driver does not feel any discomfort.

In the vehicle control device, the first control termination time control device may be a driving force change device that changes the force that the driving source produces so as to change the vehicle driving force as the first force, and the second control termination time control device may be a braking force change device that changes the force that the brake system produces so as to change the vehicle braking force as the second force. In other words, the vehicle propulsive force control device may reduce the vehicle driving force as the first force preferentially to the vehicle braking force as the second force.

With this configuration, as described before, a situation does not occur in which the vehicle accelerates even though the driver is not performing an accelerating operation when, for example, the vehicle is traveling on an uphill grade and after the specific control termination time, and the driver does not feel any discomfort.

In the vehicle control device having the driving force change device, the braking force change device may maintain the value corresponding to the target vehicle speed at the value corresponding to the target vehicle speed at the specific control termination time until the force that the driving source produces is changed to a force corresponding to the first driving force request value by the driving force change device, and change the vehicle braking force by causing the brake system to produce a force corresponding to the second braking force control amount generated by the second braking force control amount generation device so that the value of the vehicle propulsive force after the specific control termination time is equal to or smaller than the value of the vehicle propulsive force at the specific control termination time.

With this configuration, the force that the driving source produces is gradually changed toward a force corresponding to the first driving force request value (for example, "0"). In addition, the value corresponding to the target vehicle speed (for example, the target wheel speed) is maintained at a value corresponding to the target vehicle speed at the specific control termination time until the force that the driving source produces reaches the force corresponding to the first driving force request value. Then, while the force that the driving source produces is gradually decreasing toward a force corresponding to the first driving force request value, the braking force change device causes the brake system to produce a force corresponding to the second braking force control amount so that a value corresponding to the actual vehicle speed (for example, wheel speed) is maintained at a value corresponding to the target vehicle speed at the specific control termination time. Thus, the force that the brake system produces is reduced with decrease in the force that the driving source produces while maintaining vehicle speed not to substantially exceed the vehicle speed at the specific control termination time. In other words, the vehicle driving force and the vehicle braking force are controlled so that the value of "the vehicle propulsive force" in the same direction as the vehicle driving force is equal to or smaller than the value of "the vehicle propulsive force at the specific control termination time" in the same direction as the vehicle driving force. Thus, a situation does not occur in which the vehicle accelerates even though the driver is not performing an accelerating operation, and the driver does not feel any discomfort.

Also, when the vehicle is traveling on a downhill grade, for example, the driver does not feel any discomfort even if the vehicle accelerates while the driver is not performing an accelerating operation. In fact, the driver feels discomfort if the vehicle does not accelerate even though the constant speed traveling control has been terminated. When the vehicle is traveling on a downhill grade, the vehicle driving force is not often required. Thus, the force that the driving source produces has often reached a force corresponding to the first driving force request value at the specific control termination time. In this case, when the constant speed traveling control is terminated, since the force that the driving source produces has already reached a force corresponding to the first driving force request value, the braking force change device does not control the vehicle braking force to maintain the value corresponding to the target vehicle speed at a value corresponding to the target vehicle speed at the specific control termination time. Therefore, the force that the brake system produces starts to be changed toward the force corresponding to the first braking force control amount, i.e., 0, immediately after the specific control termination time. As a result, if constant speed traveling control is terminated when the vehicle is traveling on a downhill grade (when the force that the driving source produces has already reached a force corresponding to the first driving force request value), smooth acceleration of the vehicle is not impeded, and the driver does not feel any discomfort.

Instead of the aspect in which a value corresponding to the target vehicle speed is maintained, in the brake system for a vehicle having the driving force change device, the braking force change device may maintain the force that the brake system produces at the force that the brake system is producing at the specific control termination time until the force that the driving source produces is changed to the force corresponding to the first driving force request value by the driving force reduction device, and reduce the force that the brake system produces toward the force corresponding to the first braking force control amount after the force that the driving source produces reaches the force corresponding to the first driving force request value.

With this configuration, the force that the brake system produces is maintained at the force that the brake system is producing at the specific control termination time until the force that the driving source produces reaches the force corresponding to the first driving force request value (for example, until the force reaches "0"). In addition, after the force that the driving source produces has reached the force corresponding to the first driving force request value, the force that the brake system produces is reduced to the force corresponding to the first braking force control amount. Therefore, the value of "the vehicle propulsive force" in the same direction as the vehicle driving force is reliably prevented from exceeding the value of "the vehicle propulsive force at the specific control termination time" in the same direction as the vehicle driving force.

In addition, in another aspect of the vehicle control device having the driving force change device, the driving force change device may gradually reduce the force that the driving source produces toward the force corresponding to the first driving force request value after the specific control termination time in such a manner that the reduction rate of the vehicle driving force is equal to a predetermined driving force reduction rate, and the braking force change device may gradually reduce the force that the brake system produces toward the force corresponding to the first braking force control amount after the specific control termination time in such a manner that the reduction rate of the vehicle braking force is equal to a braking force reduction rate which is always lower than the driving force reduction rate.

With this configuration, since the vehicle braking force is reduced at a braking force reduction rate which is lower than the driving force reduction rate as the reduction rate of the vehicle driving force, the value of the vehicle propulsive force is reliably prevented from exceeding the value of the vehicle propulsive force at the specific control termination time.

In another aspect of the vehicle control device according to the present invention, the first control termination time control device may be a braking force change device that changes the force that the brake system produces so as to change the vehicle braking force as the first force, and the second control termination time control device may be a driving force change device that changes the force that the driving source produces so as to change the vehicle driving force as the second force. In other words, the vehicle propulsive force control device may reduce the vehicle braking force as the first force preferentially to the vehicle driving force as the second force.

With this configuration, as described before, a situation does not occur in which the vehicle decelerates even though the driver is not performing a braking operation when, for example, the vehicle is traveling on a downhill grade and after the specific control termination time, and the driver does not feel any discomfort.

A second aspect of the present invention relates to a vehicle control method for a vehicle equipped with a driving source that produces a force corresponding to a driving force request value so as to apply a vehicle driving force to the vehicle to increase the vehicle speed, and a brake system that produces a force corresponding to a braking force control amount so as to apply a vehicle braking force to the vehicle to reduce the vehicle speed. The control method includes: generating a first driving force request value based on an accelerating operation amount which is varied by an accelerating operation of the driver; generating a second driving force request value based on a value corresponding to the actual vehicle speed and a value corresponding to a predetermined target vehicle speed so that the actual vehicle speed is equal to the target vehicle speed; generating a first braking force control amount based on a braking operation amount which is varied by an braking operation of the driver; generating a second braking force control amount based on a value corresponding to the actual vehicle speed and a value corresponding to the target vehicle speed so that the actual vehicle speed is equal to the target vehicle speed; causing the driving source to produce a force corresponding to the second driving force request value and causing the brake system to produce a force corresponding to the second braking force control amount when constant speed traveling control conditions necessary to make the actual vehicle speed equal to the target vehicle speed are satisfied, and causing the driving source to produce a force corresponding to the first driving force request value and causing the brake system to produce a force corresponding to the first braking force control amount when the constant speed traveling control conditions are not satisfied; changing, when a specific control termination time at which the constant speed traveling control conditions are changed from satisfied state to unsatisfied state comes while neither the accelerating operation nor the braking operation is performed, a first force, which is the greater of the vehicle driving force and the vehicle braking force at the specific control termination time, toward one of a vehicle driving force resulting from a force that the driving source produces in accordance with the first driving force request value and a vehicle braking force resulting from a force that the brake system produces in accordance with the first braking force control amount that corresponds to the first force after the specific control termination time; and changing a second force, which is the smaller of the vehicle driving force and the vehicle braking force, toward one of a vehicle driving force resulting from a force that the driving source produces in accordance with the first driving force request value and a vehicle braking force resulting from a force that the brake system produces in accordance with the first braking force control amount that corresponds to the second force after the specific control termination time so that the value of a vehicle propulsive force, which takes a positive value when acting in the same direction as the first force and takes a negative value when acting in the opposite direction of the first force and which has a magnitude equal to the value resulting from subtracting the magnitude of the second force from the magnitude of the first force, is equal to or smaller than the value of the vehicle propulsive force at the specific control termination time.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2A is graphs showing changes in wheel speed and target wheel speed, braking hydraulic pressures, and driving force request value, respectively, in the case where a vehicle is traveling on an uphill grade and in the case of a conventional vehicle control device;

FIG. 2B is graphs showing changes in wheel speed and target wheel speed, braking hydraulic pressures, and driving force request value, respectively, in the case where a vehicle is traveling on an uphill grade and in the case of the first control device according to one aspect of the present invention;

FIG. 12A is graphs showing changes in braking hydraulic pressures and driving force request value, respectively, in the case where a vehicle is traveling on an uphill grade and in the case of a conventional vehicle control device;

FIG. 12B is graphs showing changes in braking hydraulic pressures and driving force request value, respectively, in the case where a vehicle is traveling on an uphill grade and in the case of a second control device according to one aspect of the present invention;

DETAILED DESCRIPTION OF EMBODIMENTS

Description is hereinafter made of embodiments of the present invention with reference to the accompanying drawings.

First Embodiment

Figure 1:
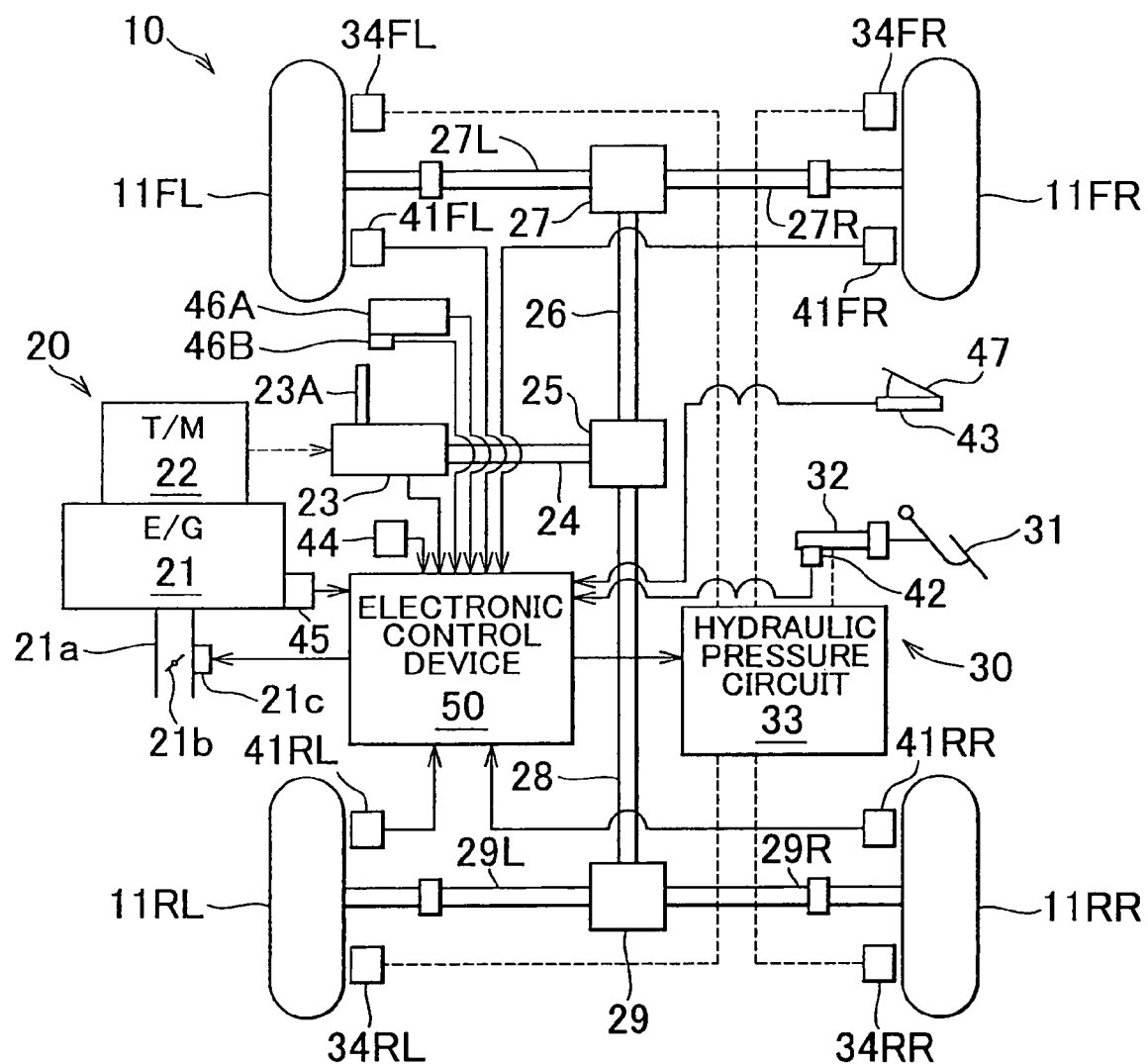
FIG. 1 is a schematic configuration diagram of a vehicle control device according to a first embodiment of the present invention (first control device) applied to a vehicle.

FIG. 1 shows the general configuration of a vehicle control device according to a first embodiment of the present invention (which is hereinafter referred to as "first control device") applied to a vehicle 10. The vehicle 10 is a four-wheel-drive vehicle, and has a right front wheel 11FR, a left front wheel 11FL, a right rear wheel 11RR and a left rear wheel 11RL. The vehicle 10 also has a drive unit 20 and a brake system 30.

The drive unit 20 has an engine (internal combustion engine) 21 as a driving source of the vehicle 10, a transmission 22, a transfer 23, an output shaft 24, and a center differential 25.

The engine 21 is a well-known spark ignition internal combustion engine equipped with an electronic fuel injection device. The engine 21 has an intake pipe 21a defining an intake passage, a throttle valve 21b, and a throttle valve actuator 21c.

The throttle valve 21b is rotatably supported in the intake pipe 21a. The rotational angle (opening) of the throttle valve 21b is changed to change the open cross-sectional area in the intake pipe 21a, whereby the output torque the engine 21 produces is varied. The throttle valve actuator 21c changes the rotational angle (opening) of the throttle valve 21b in response to a drive signal (command signal).

The transmission 22 has a well-known gear mechanism. The transmission 22 establishes an optimum transmission ratio for the driving conditions of the vehicle 10. The transfer 23 includes an auxiliary transmission having a well-known gear mechanism. The transfer 23 transmits drive power in a power transmission mode for a high-speed gear ratio (which may be hereinafter referred to as "H-range mode" as needed) or a power transmission mode for a low-speed gear ratio (which may be hereinafter referred to as "L-range mode" as needed) when an operation lever 23A is operated by the driver. In addition, the transfer 23 outputs a signal indicating whether the operation lever 23A is in the "H-range mode" position or the "L-range mode" position to an electronic control device 50, which is described later.

With the above configuration, the output torque of the engine 21 (the power the driving source produces) is converted in accordance with a transmission gear ratio which is determined based on the conditions of the transmission 22 and the transfer 23. The output shaft 24 transmits the converted torque to the center differential 25.

In addition, the drive unit 20 has a front wheel propeller shaft 26, a front differential 27, a right front wheel drive shaft 27R, and a left front wheel drive shaft 27L.

The front wheel propeller shaft 26 transmits the torque transmitted to the center differential 25 via the output shaft 24 and output from the center differential 25 to the front differential 27.

The front differential 27 transmits the torque transmitted thereto via the front wheel propeller shaft 26 to the right front wheel drive shaft 27R and the left front wheel drive shaft 27L. The right front wheel drive shaft 27R rotates the right front wheel 11FR with the torque transmitted thereto from the front differential 27. Similarly, the left front wheel drive shaft 27L rotates the left front wheel 11FL with the torque transmitted thereto from the front differential 27.

Further, the drive unit 20 has a rear wheel propeller shaft 28, a rear differential 29, a right rear wheel drive shaft 29R, and a left rear wheel drive shaft 29L.

The rear wheel propeller shaft 28 transmits the torque output from the center differential 25 to the rear differential 29. The rear differential 29 transmits the torque transmitted thereto via the rear wheel propeller shaft 28 to the right rear wheel drive shaft 29R and the left rear wheel drive shaft 29L.

The right rear wheel drive shaft 29R rotates the right rear wheel 11RR with the torque transmitted thereto from the rear differential 29. Similarly, the left rear wheel drive shaft 29L rotates the left rear wheel 11RL with the torque transmitted thereto from the rear differential 29.

With the above configuration, the output torque of the engine 21 (that is, the force the driving source produces) is converted into driving forces to rotate the right front wheel 11FR, the left front wheel 11FL, the right rear wheel 11RR, and the left rear wheel 11RL (that is, a vehicle driving force to increase the vehicle speed).

The brake system 30 has a brake pedal 31, a master cylinder 32, a hydraulic pressure circuit 33, and wheel cylinders 34FR, 34FL, 34RR and 34RL.

The master cylinder 32 has a well-known configuration, and increases and decreases the braking hydraulic pressure (master cylinder pressure) to be transmitted to the hydraulic pressure circuit 33 in accordance with the displacement of the brake pedal 31.

The hydraulic pressure circuit 33 has a reservoir, an oil pump and various types of valve devices (which are not shown), and generates temporary braking hydraulic pressures to be applied to the wheel cylinders 34FR, 34FL, 34RR and 34RL in response to a signal from the electronic control device 50, which is described later. The hydraulic pressure circuit 33 applies either the master cylinder pressure or the produced temporary braking hydraulic pressures to the wheel cylinders 34FR, 34FL, 34RR and 34RL as final braking hydraulic pressures based on a signal from the electronic control device 50.

The wheel cylinders 34FR, 34FL, 34RR and 34RL are positioned corresponding to the right front wheel 11FR, the left front wheel 11FL, the right rear wheel 11RR and the left rear wheel 11RL, respectively. The wheel cylinders 34FR, 34FL, 34RR and 34RL produce wheel braking forces to reduce the rotational speed of the rotors rotatable together with the right front wheel 11FR, the left front wheel 11FL, the right rear wheel 11RR and the left rear wheel 11RL based on the braking hydraulic pressures applied by the hydraulic pressure circuit 33.

With the above configuration, the master cylinder pressure or the braking hydraulic pressure adjusted by the hydraulic pressure circuit 33 is converted into braking forces to reduce the rotational speed of the right front wheel 11FR, the left front wheel 11FL, the right rear wheel 11RR and the left rear wheel 11RL (that is, vehicle braking force to reduce the vehicle speed). A vehicle braking force is the total of the forces applied to the wheels to reduce the rotational speed of the wheels (a force applied to the vehicle), and is applied in the opposite direction of the vehicle driving force to propel the vehicle 10 in the traveling direction. In the following description, the force applied to a wheel is referred to as "wheel braking force," and the force applied to the vehicle is referred to as "vehicle braking force."

The first control device has wheel speed sensors 41FR, 41FL, 41RR and 41RL, a pressure sensor 42, an accelerator operation amount sensor 43, a tilt sensor 44, an engine rotational speed sensor 45, a constant speed traveling control switch 46A, a target vehicle speed selector 46B, and the electronic control device 50

The wheel speed sensors 41FR, 41FL, 41RR and 41RL acquire a wheel speed VwFR of the right front wheel 11FR, a wheel speed VwFL of the left front wheel 11FL, a wheel speed VwRR of the right rear wheel 11RR, and a wheel speed VwRL of the left rear wheel 11RL, respectively. Each of the wheel speed sensors 41FR, 41FL, 41RR and 41RL outputs the acquired information to the electronic control device 50 in the form of a signal.

The pressure sensor 42 acquires a master cylinder pressure Pm. The pressure sensor 42 outputs the acquired information to the electronic control device 50 in the form of a signal. The accelerator operation amount sensor 43 acquires a displacement Ap of an accelerator pedal 47. The accelerator operation amount sensor 43 outputs the acquired information to the electronic control device 50 in the form of a signal. The tilt sensor 44 outputs a signal indicating the tilt angle of the vehicle (which is hereinafter referred to as "tilt G") to the electronic control device 50. A tilt G of "0" means that the vehicle is horizontal, and a positive tilt G means that the front of the vehicle is higher in elevation than the rear of the vehicle. The engine rotational speed sensor 45 acquires a rotational speed NE of the engine 21. The engine rotational speed sensor 45 outputs the acquired information to the electronic control device 50 in the form of a signal.

The constant speed traveling control switch 46A outputs a signal indicating an ON state or OFF state selected by the driver to the electronic control device 50. The target vehicle speed selector 46B outputs a signal indicating the position of the target vehicle speed selector 46B (Hi, Mid or Lo) selected by the driver to the electronic control device 50. The signal indicating the position of the target vehicle speed selector 46B is used to set (determine) a target vehicle speed.

The electronic control device 50 is a well-known microcomputer including a CPU, a RAM, a ROM and an input-output port. The input-output port is connected to the sensors 41 to 45, the constant speed traveling control switch 46A, the target vehicle speed selector 46B, the throttle valve actuator 21c, and the hydraulic pressure circuit 33 of the brake system 30. The input-output port supplies the signals from the sensors 41 to 45, the constant speed traveling control switch 46A and the target vehicle speed selector 46B to the CPU. The input-output port outputs a drive signal (command signal) to the throttle valve actuator 21c and outputs a brake signal (command signal) to the hydraulic pressure circuit 33 in accordance with a command of the CPU.

Outline of Operation

An outline of the operation of the first control device constituted as described above is described.

When the constant speed traveling control switch 46A is off, the CPU of the electronic control device 50 determines that constant speed traveling control conditions necessary to perform constant speed traveling control are not satisfied, and performs normal vehicle control based on a well-known method. More specifically, the CPU increases the output torque of the engine 21 by driving the throttle valve 21b in such a manner that the greater the displacement of the accelerator pedal 47 as the amount of accelerating operation (i.e., a first driving force request value which increases with increase in the amount of accelerating operation), the greater the vehicle driving force (the force to increase the vehicle speed). When the driver is not, performing an accelerating operation (the amount of accelerating operation is "0"), the first driving force request value is "0." At this time, the throttle valve 21b is fully closed and the engine produces the torque necessary to maintain the idling rotational speed.

At the same time, the CPU applies the master cylinder pressure (that is, a first braking force control amount) to the wheel cylinders 34FR, 34FL, 34RR and 34RL as braking hydraulic pressures Pw to the wheel cylinders via the hydraulic pressure circuit 33 in such a manner that the greater the displacement of the brake pedal 31 (braking request value), the greater the vehicle braking force. That is, the CPU causes the brake system 30 to produce wheel braking forces (forces to decrease the rotational speed of wheels) corresponding to the first braking force control amount.

When the CPU determines that the constant speed traveling control conditions, including one that the constant speed traveling control switch 46A is on, are satisfied, the CPU performs the constant speed traveling control as described below. In the following, the description is split into two cases: the case where the vehicle 10 is traveling on an uphill grade (running uphill) and the case where the vehicle is traveling on a downhill grade (running downhill).

When Running Uphill

FIG. 2 shows time charts each showing an outline of operation which a control device performs when the vehicle is traveling on an uphill grade. In this example, the driver is performing neither an accelerating operation nor a braking operation. FIG. 2A is a time chart showing the operation of a conventional vehicle control device, and FIG. 2B is a time chart showing the operation of the first control device. In FIG. 2A and FIG. 2B, the horizontal axis represents the elapse of time, and the vertical axes represent, from the top, changes in wheel speed, braking hydraulic pressure and driving force request value, respectively. The heavy-line wheel speed curve represents the wheel speed of a wheel which is not slipping, and the heavy-line braking hydraulic pressure curve represents the braking hydraulic pressure on a wheel which is not slipping. The fine-line wheel speed curve represents the wheel speed of a wheel which is slipping, and the fine-line braking hydraulic pressure curve represents the braking hydraulic pressure on a wheel which is slipping.

In the example shown in FIG. 2A and FIG. 2B, the constant speed traveling control switch 46A is on before a time t1. In this case, the CPU performs constant speed traveling control to control the vehicle driving force and vehicle braking force so that the vehicle speed SPD will be equal to the target vehicle speed TSV.

More specifically, the CPU calculates a vehicle speed SPD of the vehicle 10 based on the wheel speeds Vw (VwFR, VwFL, VwRR and VwRL) obtained from the before-mentioned wheel speed sensors 41FR, 41FL, 41RR and 41RL. For example, the CPU calculates a vehicle speed SPD by multiplying the average of the wheel speeds Vw obtained from the wheel speed sensors 41FR, 41FL, 41RR and 41RL by a constant. The calculation of a vehicle speed SPD may be made by another well-known method.

When the vehicle speed SPD is higher than the target vehicle speed TSV, the CPU changes a driving force request value EGReqTq so as to reduce the vehicle driving force. Then, the CPU reduces the output torque by driving the throttle valve actuator 21c (reducing the opening of the throttle valve 21b) based on the driving force request value EGReqTq. As a result, the vehicle driving force decreases. When the vehicle speed SPD is equal to or lower than the target vehicle speed TSV, the CPU changes the driving force request value EGReqTq so as to increase the vehicle driving force. Then, the CPU increases the output torque by driving the throttle valve actuator 21c (increasing the opening of the throttle valve 21b) based on the driving force request value EGReqTq. As a result, the vehicle driving force increases. Since the vehicle driving force is increased and decreased as described above, the vehicle speed SPD approaches the target vehicle speed TSV. The driving force request value EGReqTq changed during the constant speed traveling control (driving force request value EGReqTqC) corresponds to a second driving force request value.

The CPU compares each of the wheel speeds Vw obtained from the wheel speed sensors 41FR, 41FL, 41RR and 41RL with the target wheel speed TBV, and increases the braking hydraulic pressures Pw on the wheels with a wheel speed Vw which is equal to or higher than the target wheel speed TBV. Therefore, the wheel braking forces on the wheels with an increased braking hydraulic pressure Pw thereon increase.

Also, the CPU reduces the braking hydraulic pressures Pw on the wheels with a wheel speed Vw which is lower than the target wheel speed TBV. Therefore, the wheel braking forces on the wheels with a decreased braking hydraulic pressure Pw thereon decrease. As a result, the vehicle braking force on the vehicle is increased or decreased, and the vehicle speed SPD approaches the target vehicle speed TSV. The target wheel speed TBV is obtained by adding a predetermined value which is equal to or greater than 0 to the value resulting from converting the target vehicle speed TSV into a wheel speed, for example. Thus, it can be said that the target wheel speed TBV is a value corresponding to the target vehicle speed TSV. Also, it can be said that a wheel speed Vw is a value corresponding to the vehicle speed SPD. The braking hydraulic pressures Pw changed during the constant speed traveling control (temporary braking hydraulic pressures PwC) correspond to a second braking force control amount.

As described before, since the vehicle is traveling on an uphill grade, the vehicle speed SPD cannot be maintained at the target vehicle speed TSV unless the vehicle driving force is to some extent greater than the vehicle braking force. Therefore, the vehicle driving force is greater than the vehicle braking force at the time t1.

Then, the constant speed traveling control switch 46A is switched from on to off at the time t1 in FIG. 2A and FIG. 2B. In this case, the CPU determines that the conditions necessary to terminate the constant speed traveling control are satisfied (the constant speed traveling control conditions are changed from satisfied state to unsatisfied state), and terminates the constant speed traveling control. The time t1, i.e., the time at which when the constant speed traveling control is terminated in the case where the driver is performing neither an accelerating operation nor a decelerating operation, is hereinafter referred to as "specific control termination time."

A conventional vehicle control device changes the vehicle driving force to a vehicle driving force corresponding to the amount of accelerating operation performed by the driver and changes the vehicle braking force to a vehicle braking force corresponding to the amount of braking operation performed by the driver when the specific control termination time t1 comes. As described before, the amount of accelerating operation and the amount of braking operation are both "0" (neither an accelerating operation nor a braking operation is performed) at the time t1. Thus, the conventional control device changes both the vehicle driving force and the vehicle braking force toward "0" without associating the vehicle driving force with the vehicle braking force.

More specifically, the conventional control device reduces the driving force request value EGReqTq toward "0" from the time t1 as shown in FIG. 2A, and reduces the vehicle braking force (braking hydraulic pressures) also toward "0" by gradually increasing the target wheel speed TBV regardless of the driving force request value EGReqTq. At this time, since the vehicle braking force usually decreases more quickly than the vehicle driving force, the vehicle driving force can be excessive relative to the vehicle braking force immediately after the time t1. As a result, even though the vehicle is traveling on an uphill grade and the driver is not performing an accelerating operation, the vehicle can start accelerating immediately after the constant speed traveling control is terminated (immediately after the time t1) and cause the driver to feel discomfort.

On the contrary, the first control device according to one aspect of the present invention records (stores) the driving force request value EGReqTq at the specific control termination time t1 (=EGReqTq0) as a default value of the driving force request value EGReqTq for backup control in the RAM when the specific control termination time comes. In addition, the CPU records (stores) the target wheel speed TBY at the specific control termination time t1 (=TBV0) as a default value of the target wheel speed TBV for backup control in the RAM, and starts backup control.

More specifically, the first control device reduces the driving force request value EGReqTq toward a value corresponding to the amount of accelerating operation performed by the driver so as to reduce the vehicle driving force in the backup control. In this case, since the driver is performing neither an accelerating operation nor a braking operation, "the value corresponding to the amount of accelerating operation performed by the driver" is "0." Therefore, the driving force request value EGReqTq reaches "0" at a time t2 in FIG. 2B.

In addition, the first control device maintains the target wheel speed TBV at the target wheel speed TBV at the specific control termination time (=TBV0) until the driving force request value EGReqTq reaches the value corresponding to the amount of accelerating operation performed by the driver (that is, until the time t2 in FIG. 2B), and continues the constant speed traveling control. Since the vehicle 10 is traveling on an uphill grade at the moment, the vehicle speed SPD decreases with the reduction of the driving force request value EGReqTq (decrease in the vehicle driving force). Thus, the first control device reduces the vehicle braking force by reducing the braking hydraulic pressures Pw on the wheels so that the wheel speeds Vw can be maintained at the target wheel speed TBV.

As described above, according to the first control device, the target wheel speed TBV is maintained at the target wheel speed TBV at the specific control termination time t1 (=TBV0) until the driving force request value EGReqTq reaches "0." In other words, while the driving force request value EGReqTq is gradually decreasing toward "0," the first control device changes the vehicle braking force that the brake system 30 produces toward "0" so that the value of a "vehicle propulsive force," which takes a positive value when acting in the same direction as the vehicle driving force, which is greater than the vehicle braking force at the specific control termination time t1, and takes a negative value when acting in the opposite direction of the vehicle driving force, and which has a magnitude equal to the difference resulting from subtracting the magnitude of the vehicle braking force from the magnitude of the vehicle driving force, will be smaller than the value of "the vehicle propulsive force at the specific control termination time t1."

Thus, the vehicle braking force is reduced with the decrease in the vehicle driving force while maintaining the vehicle speed SPD not to substantially exceed the vehicle speed SPD at the specific control termination time t1 (that is, keeping the vehicle 10 from accelerating). In other words, since the vehicle driving force and the vehicle braking force are controlled so that the value of the vehicle propulsive force will be equal to or lower than the value of the vehicle propulsive force at the specific control termination time, the vehicle driving force is prevented from becoming excessive relative to the vehicle braking force. As a result, a situation does not occur in which the vehicle accelerates even though the driver is not performing an accelerating operation when, for example, the vehicle is traveling on an uphill grade, and the driver does not feel any discomfort.

When Running Downhill

Figure 3A:
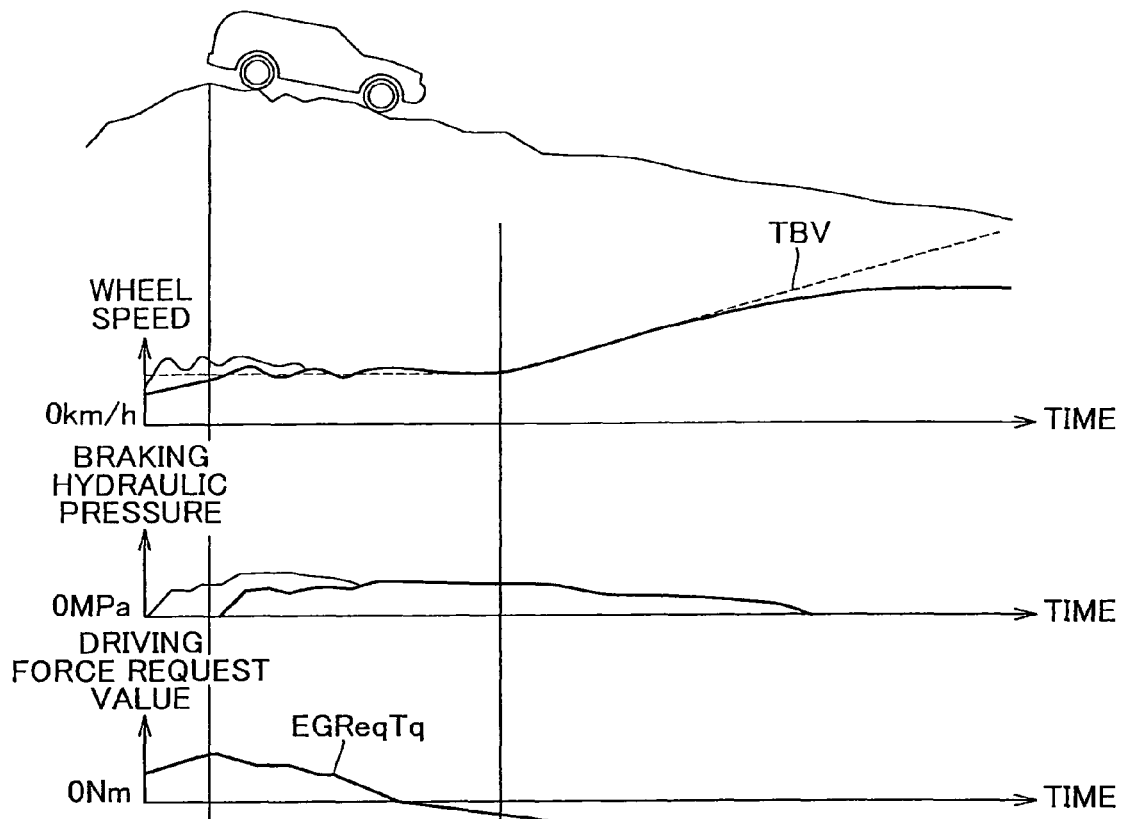
FIG. 3A is graphs showing changes in wheel speed and target wheel speed, braking hydraulic pressures, and driving force request value, respectively, in the case where a vehicle is traveling on a downhill grade and in the case of a conventional vehicle control device.
Figure 3B:
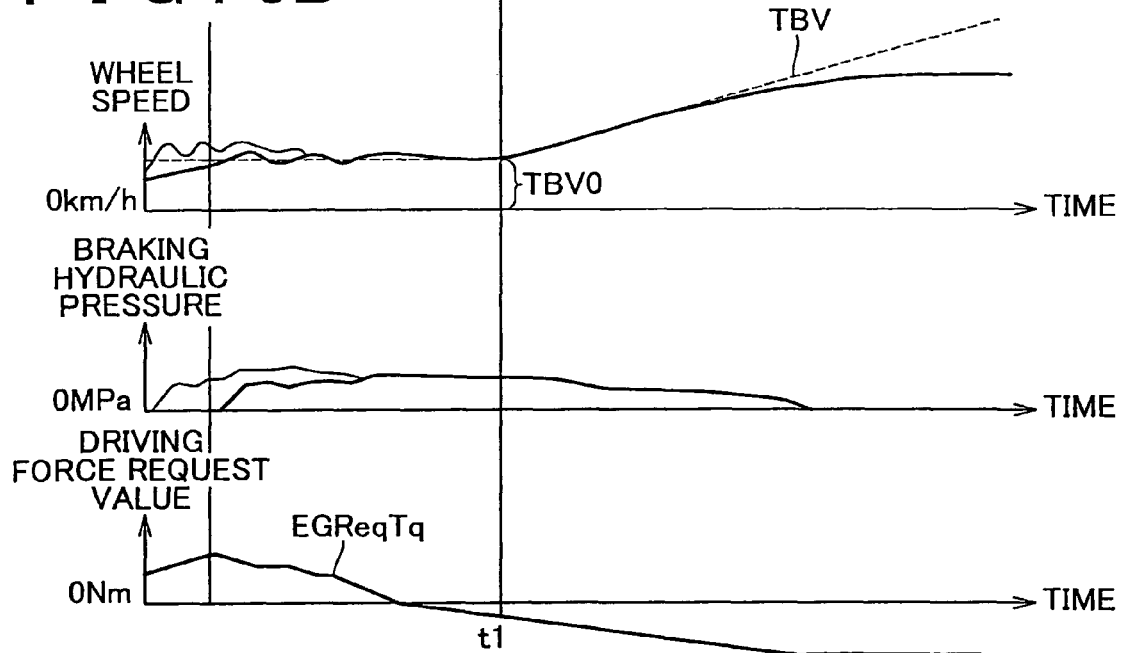
FIG. 3B is graphs showing changes in wheel speed and target wheel speed, braking hydraulic pressures, and driving force request value, respectively, in the case where a vehicle is traveling on a downhill grade and in the case of the first control device according to one aspect of the present invention.

FIG. 3A and FIG. 3B are time charts each showing an outline of operation which a control device performs when the vehicle is traveling on a downhill grade. In this example, the driver is performing neither an accelerating operation nor a braking operation as in the case of running uphill. FIG. 3A is a time chart showing the operation of a conventional vehicle control device, and FIG. 3B is a time chart showing the operation of the first control device. In FIG. 3A and FIG. 3B, the horizontal axis represents the elapse of time, and the vertical axes represent, from the top, changes in wheel speed, braking hydraulic pressure and driving force request value, respectively. The heavy-line wheel speed curve represents the wheel speed of a wheel which is not slipping, and the heavy-line braking hydraulic pressure curve represents the braking hydraulic pressure on a wheel which is not slipping. The fine-line wheel speed curve represents the wheel speed of a wheel which is slipping, and the fine-line braking hydraulic pressure curve represents the braking hydraulic pressure on a wheel which is slipping.

When the vehicle is traveling on a downhill grade, the driver does not feel any discomfort even if the vehicle accelerates while the driver is not performing an accelerating operation. In fact, the driver feels discomfort if the vehicle does not accelerate even though the constant speed traveling control has been terminated. On the other hand, when the vehicle is traveling on a downhill grade during constant speed traveling control, the vehicle driving force is not often required. Thus, the driving force request value EGReqTq already has a value corresponding to the amount of accelerating operation, i.e., it is "0" or smaller, at the specific control termination time (time t1) as shown in FIG. 3A and FIG. 3B.

In this case, when the specific control termination time t1 comes, since the driving force request value EGReqTq is already "0" or smaller, the first control device does not perform control of the vehicle braking force by maintaining the target wheel speed TBV at the target wheel speed TBV at the specific control termination time (=TBV0). In other words, the first control device starts increasing the target wheel speed TBV and reducing the wheel braking forces immediately after the specific control termination time t1 just as the conventional vehicle control device does. Thus, when the constant speed traveling control is terminated while the vehicle is traveling on a downhill grade, the first control device operates in the same way as the conventional vehicle control device not to impede smooth acceleration of the vehicle. Therefore, the driver does not feel any discomfort.

Details of Operation

The details of the operation of the first control device are described with reference to a flowchart showing a routine which the CPU executes at regular intervals.

The case where the constant speed traveling control is not performed (during normal control) and constant speed traveling control start conditions are not satisfied is first described. The constant speed traveling control start condition are satisfied when the shift position of the transfer 23 is in the L-range, the vehicle speed SPD is "0," and the constant speed traveling control switch 46A is on.

Figure 4:
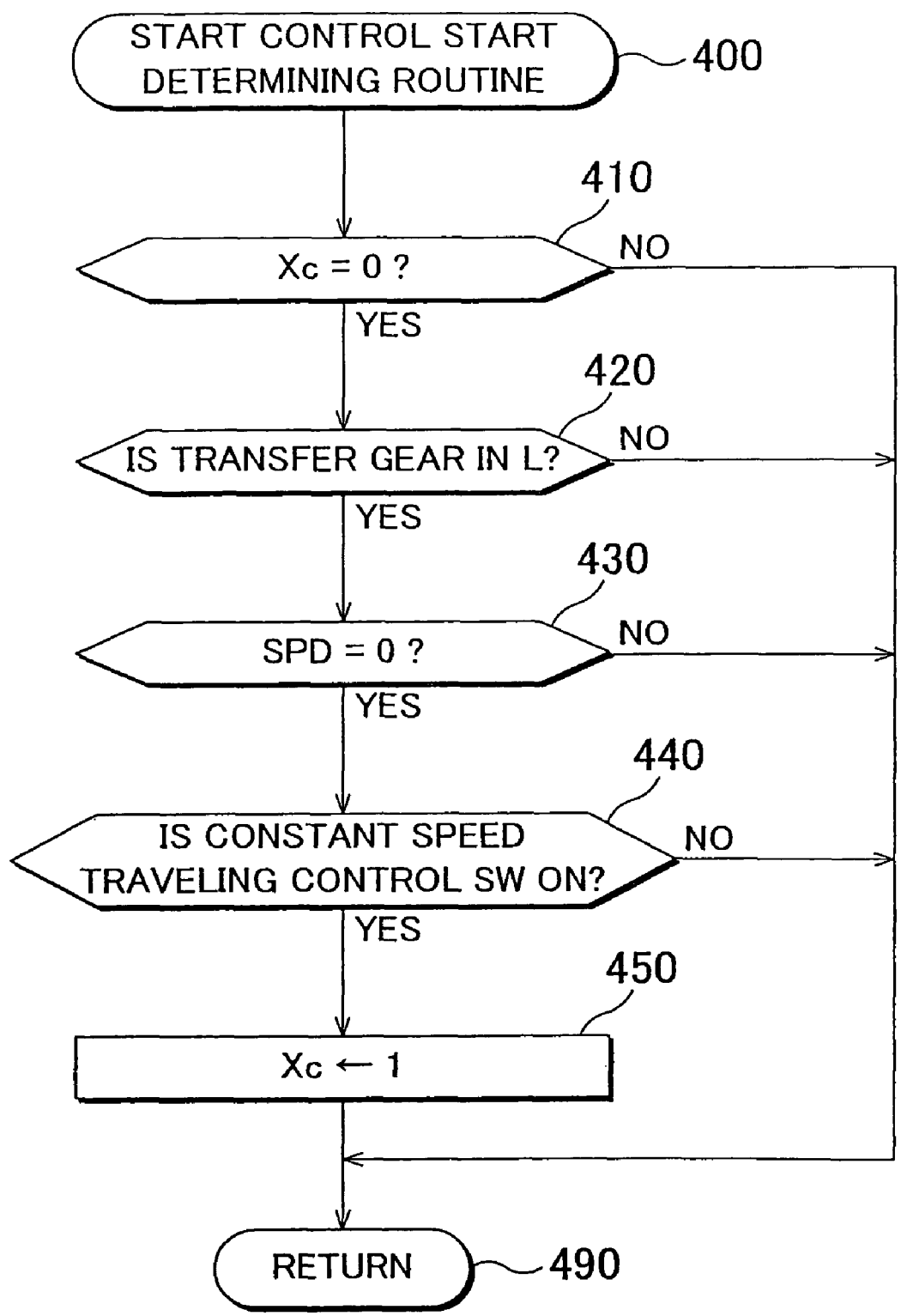
FIG. 4 is a flowchart showing a constant speed traveling control start determining routine of the first control device according to one aspect of the present invention.

The CPU starts an operation in step 400 in FIG. 4 at a predetermined time, and determines whether or not the constant speed traveling control condition flag Xc is "0" in step 410. The constant speed traveling control condition flag Xc indicates that the constant speed traveling control conditions are satisfied (that is, it is now in the period between when the constant speed traveling control start conditions are satisfied and when the termination conditions of the constant speed traveling control are satisfied) when it is "1." Also, the constant speed traveling control condition flag Xc indicates that the constant speed traveling control conditions are not satisfied when it is "0." The constant speed traveling control condition flag Xc is set to "0" by an initial routine which is executed when the ignition key (not shown) is turned from off to on.

Based on the assumption described above (the assumption that the constant speed traveling control is not performed and the constant speed traveling control start conditions are not satisfied), the constant speed traveling control condition flag Xc is "0." Thus, the CPU selects "Yes" in step 410, and performs steps 420 to 440 described below.

In step 420, the CPU determines whether or not the shift position of the transfer 23 is in the L-range. The CPU proceeds to step 430 if the shift position of the transfer 23 is in the L-range, and proceeds directly to step 490 and terminates the current routine if the shift position of the transfer 23 is not in the L-range. In step 430, the CPU determines whether or not the vehicle speed SPD calculated based on the wheel speeds Vw is "0." The CPU proceeds to step 440 if the vehicle speed SPD is "0," and proceeds directly to step 490 and terminates the current routine if the vehicle speed SPD is not "0." In step 440, the CPU determines whether or not the constant speed traveling control switch 46A is on. The CPU proceeds to step 450 if the constant speed traveling control switch 46A is on, and proceeds directly to step 490 and terminates the current routine if the constant speed traveling control switch 46A is not on.

Based on the assumption described before, at least one of the following is true: the shift position of the transfer 23 is not in the L-range, the SPD is not "0," and the constant speed traveling control switch 46A is not on. Thus, the CPU proceeds directly to step 490 from one of the steps 420 to 440. As a result, since step 450 to set the constant speed traveling control condition flag Xc to "1" is not performed, the constant speed traveling control condition flag Xc is maintained at "0."

Figure 5:
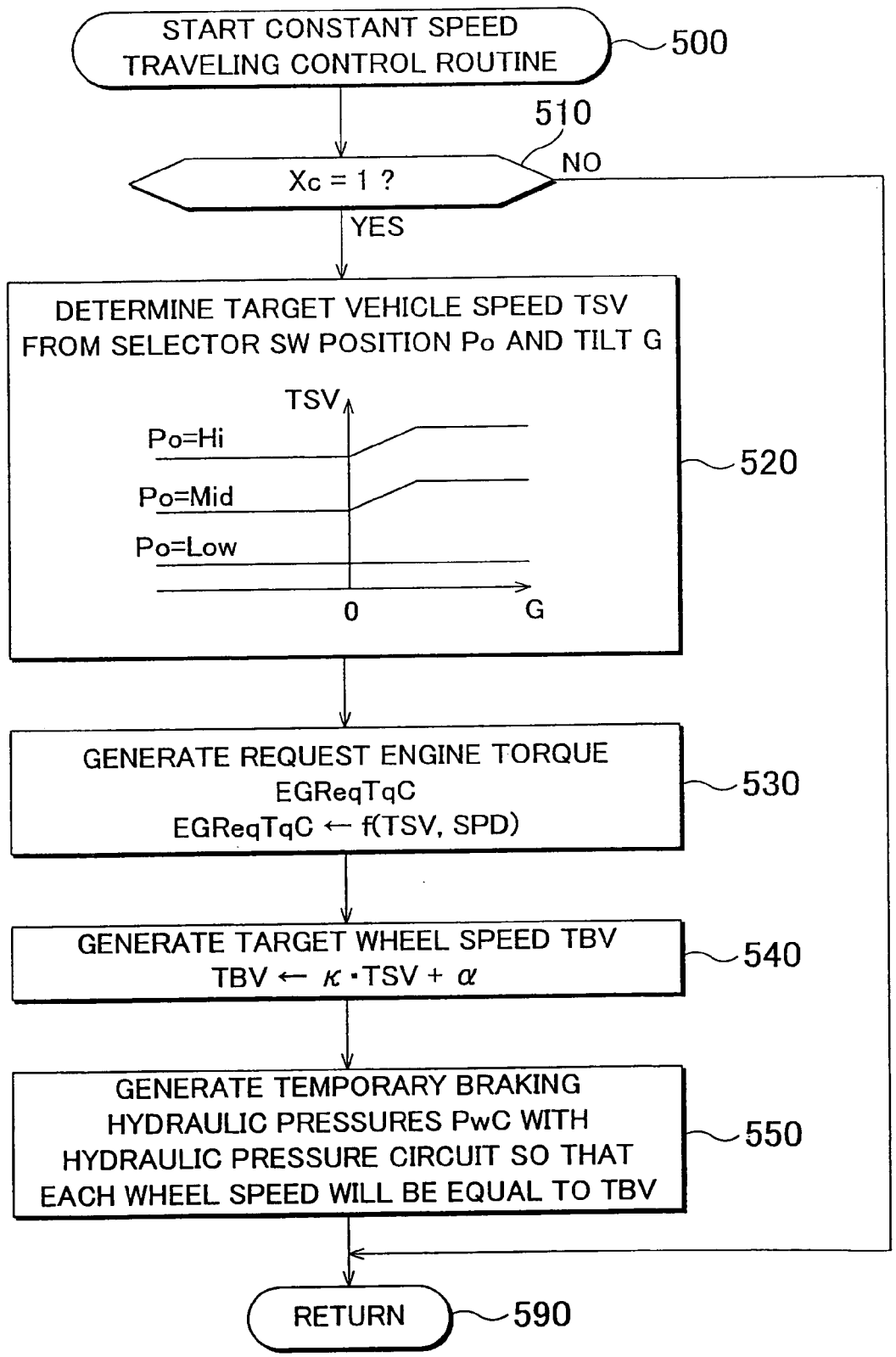
FIG. 5 is a flowchart showing a constant speed traveling control routine of the first control device according to one aspect of the present invention.

The CPU also starts an operation in step 500 in FIG. 5 at a predetermined time, and determines whether or not the constant speed traveling control condition flag Xc is "1" in step 510. In this case, since the constant speed traveling control condition flag Xc is "0," the CPU proceeds from step 510 directly to step 590, and terminates the current routine.

Figure 6:
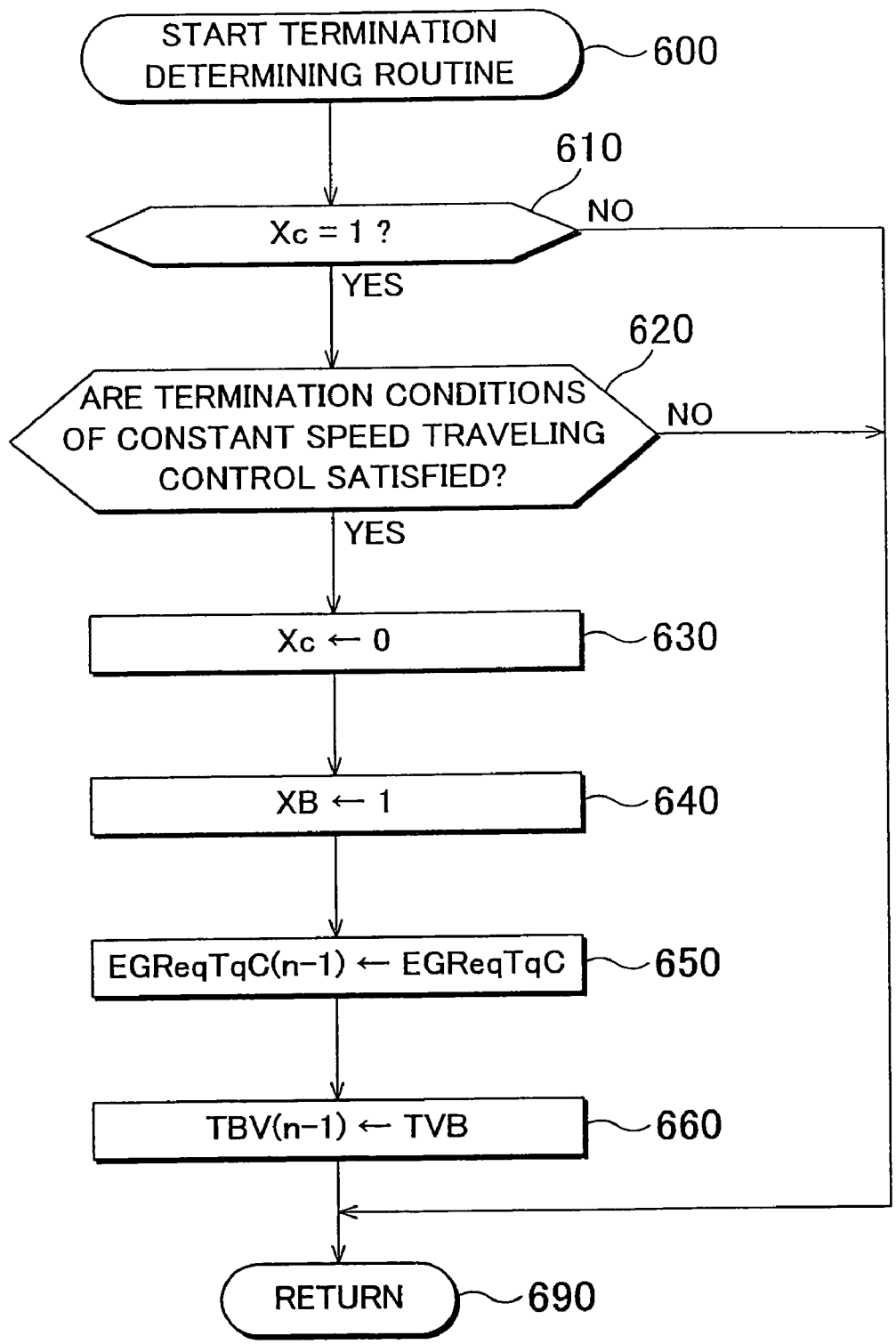
FIG. 6 is a flowchart showing a constant speed traveling control termination determining routine of the first control device according to one aspect of the present invention.

The CPU also starts an operation in step 600 in FIG. 6 at a predetermined time, and determines whether or not the constant speed traveling control condition flag Xc is "1" in step 610. In this case, since the constant speed traveling control condition flag Xc is "0," the CPU proceeds from step 610 directly to step 690, and terminates the current routine.

Figure 7:
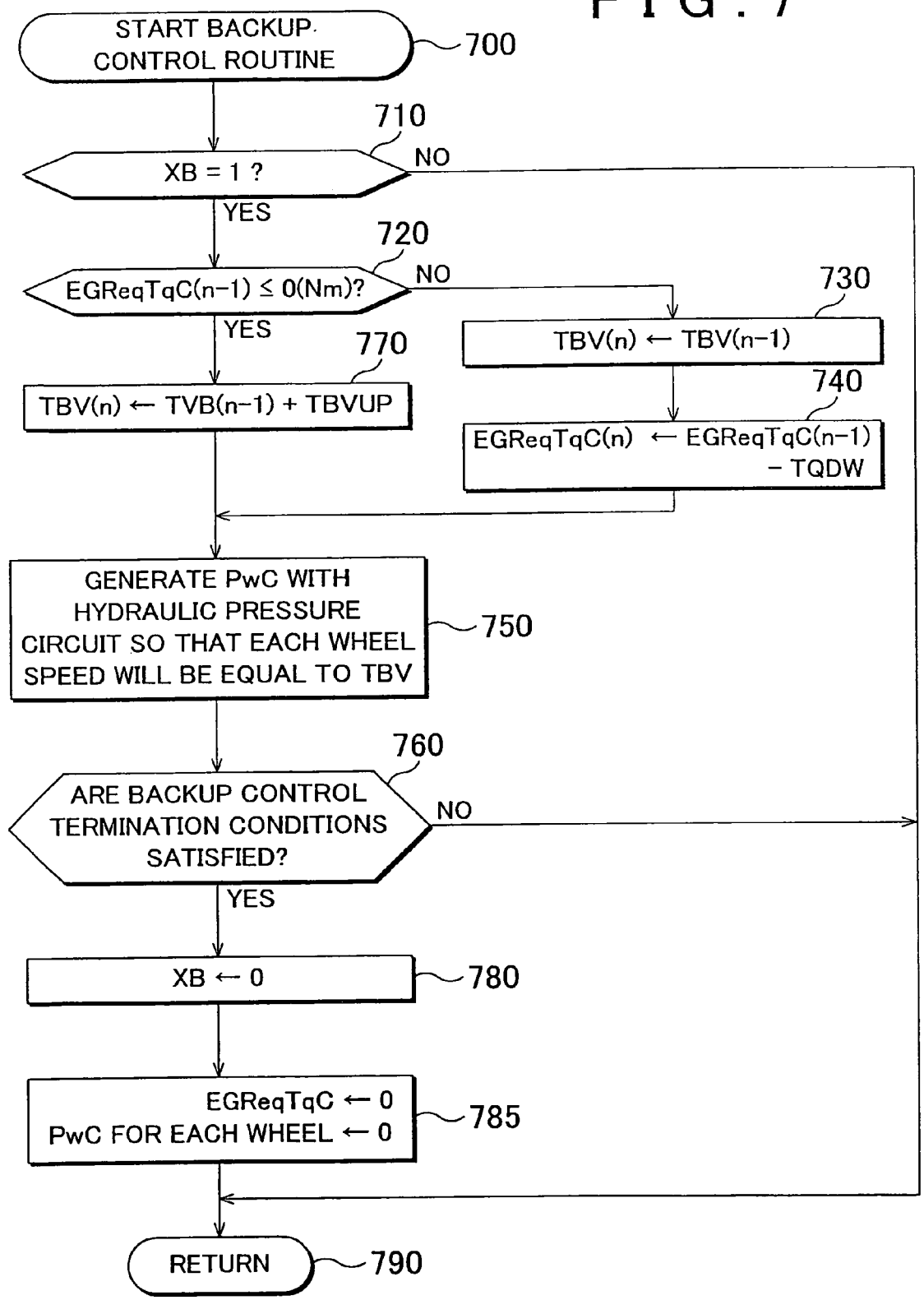
FIG. 7 is a flowchart showing a backup control routine of the first control device according to one aspect of the present invention.

The CPU also starts an operation in step 700 in FIG. 7 at a predetermined time, and determines whether or not a backup control condition flag XB is "1" in step 710. The backup control condition flag XB indicates that the backup control conditions are satisfied (that is, it is now in the period between when the backup control start conditions are satisfied and when the backup control termination conditions are satisfied) when it is "1." The backup control condition flag XB is set to "1" in step 640 in FIG. 6, which is described later. Also, the backup control condition flag XB indicates that the backup control conditions are not satisfied when it is "0." The backup control start conditions are the same as the termination conditions of the constant speed traveling control, which are described in detail later. That is, the backup control start conditions are satisfied when the termination conditions of the constant speed traveling control are satisfied in the state where the constant speed traveling control conditions are satisfied. The backup control condition flag XB is set to "0" in step 780 in FIG. 7, which is described later. In addition, the backup control condition flag XB is set to "0" by the initial routine described before.

Based on the assumption described before, since the constant speed traveling control conditions are not satisfied (that is, step 640 in FIG. 6 has not been performed since the constant speed traveling control condition flag Xc is "0"), the backup control condition flag XB is "0." Thus, the CPU proceeds from step 710 to directly to step 790, and terminates the current routine.

Figure 8:
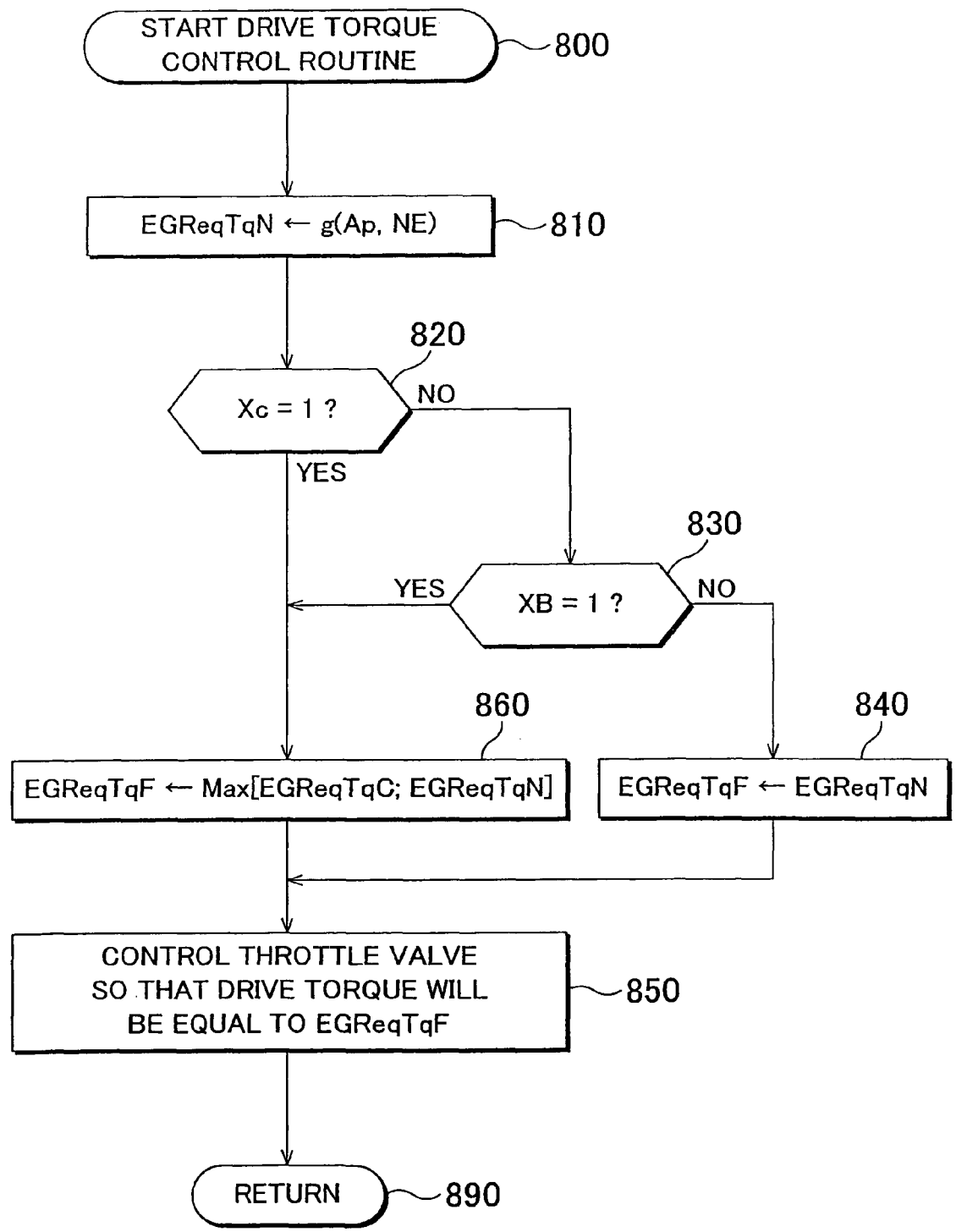
FIG. 8 is a flowchart showing a drive torque control routine of the first control device according to one aspect of the present invention.

The CPU also starts an operation in step 800 in FIG. 8 at a predetermined time, and generates a normal time driving force request value (first driving force request value) EGReqTqN for normal control mode, which is different from constant speed traveling control mode, in step 810 based on a table defining the relationship among the displacement Ap of the accelerator pedal 47, the rotational speed NE of the engine 21 and the driving force request value EGReqTq, the actual displacement Ap of the accelerator pedal 47 and the actual rotational speed NE of the engine 21. In the table, the greater the displacement Ap of the accelerator pedal 47, the greater the driving force request value EGReqTq.

Next, the CPU proceeds to step 820, and determines whether or not the constant speed traveling control condition flag Xc is "1." In this case, since the constant speed traveling control condition flag Xc is "0," the CPU selects "No" and proceeds to step 830, where the CPU determines whether or not the backup control condition flag XB is "1."

In this case, the backup control condition flag XB is "0." Thus, the CPU selects "No" in step 830 and proceeds to step 840, where the CPU sets the normal time driving force request value EGReqTqN as an output driving force request value EGReqTqF to be finally output. Then, the CPU proceeds to step 850.

In step 850, the CPU controls the opening of the throttle valve 21b so that the output torque of the engine 21 will be equal to the output driving force request value EGReqTqF. Then, the CPU proceeds to step 890 and terminates the current routine.

Figure 9:
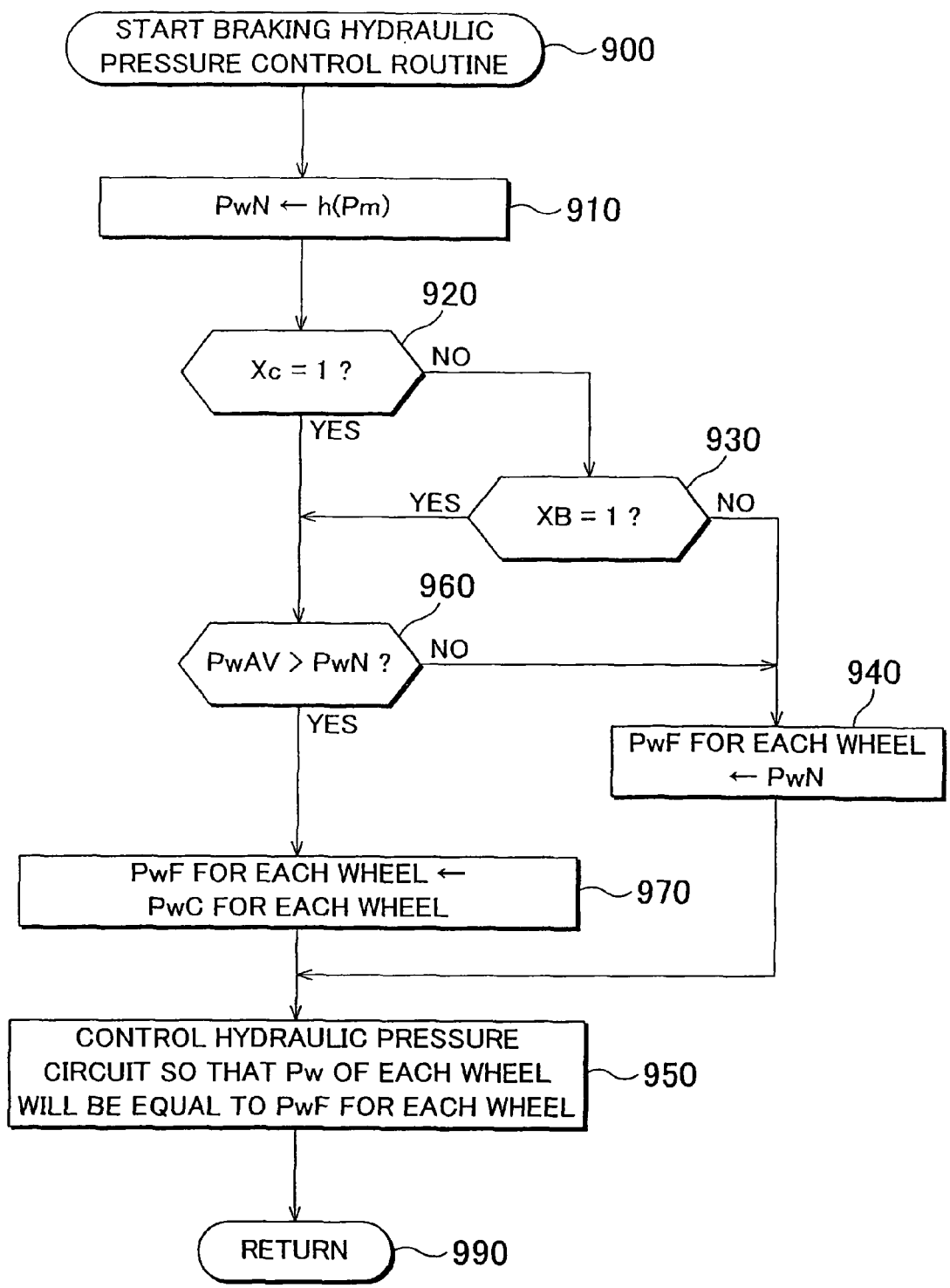
FIG. 9 is a flowchart showing a braking hydraulic pressure control routine of the first control device according to one aspect of the present invention.

The CPU also starts an operation in step 900 in FIG. 9 at a predetermined time, and acquires the master cylinder pressure Pm as a normal time braking hydraulic pressure (first braking force control amount) PwN for normal control mode, which is different from constant speed traveling control mode, in step 910. Next, the CPU proceeds to step 920, and determines whether or not the constant speed traveling control condition flag Xc is "1." In this case, since the constant speed traveling control condition flag Xc is "0," the CPU proceeds to step 930. In step 930, the CPU determines whether or not the backup control condition flag XB is "1." In this case, since the backup control condition flag XB is "0," the CPU proceeds to step 940 and set output braking hydraulic pressures PwF to be finally output to the normal time braking hydraulic pressure PwN.

Next, the CPU proceeds to step 950, and controls the hydraulic pressure circuit 33 so that the wheel cylinders 41FR to 41RL of the wheels will have the output braking hydraulic pressures PwF. Then, the CPU proceeds to step 990 and terminates the current routine.

As described above, according to the first control device of one aspect of the present invention, the output driving force request value EGReqTqF becomes a value corresponding to the displacement Ap of the accelerator pedal 47 and the output braking hydraulic pressures PwF become hydraulic pressures corresponding to the master cylinder pressure Pm based on the displacement of the brake pedal 31 during normal control. In other words, a torque corresponding to the amount the accelerator is being operated by the driver is output from the engine 21 and wheel braking forces corresponding to the amount the brake is being operated by the driver are applied to the wheels.

The case where the constant speed traveling control is not performed (during normal control) and the constant speed traveling control start conditions are satisfied is next described. That is, the case where the shift position of the transfer 23 is in the L-range, the vehicle speed SPD is 0, and the constant speed traveling control switch 46A is turned on during normal control is described.

The CPU starts an operation in step 400 in FIG. 4 at a predetermined time. In this case, the CPU selects "Yes" in step 410 since the constant speed traveling control condition flag Xc is "0," selects "Yes" in the following steps 420 to step 440, and proceeds to step 450. Then, the CPU sets the constant speed traveling control condition flag Xc to "1" in step 450 and proceeds to step 490, where the CPU terminates the current routine.

The CPU also starts an operation in step 500 in FIG. 5 at a predetermined time, and determines whether or not the constant speed traveling control condition flag Xc is "1" in step 510.

The constant speed traveling control condition flag Xc has been set to "1" in step 450. Thus, the CPU selects "Yes" in step 510 and sequentially performs step 520 to step 550 described below. In step 520, the CPU determines a target vehicle speed TSV from the position (Hi, Mid or Low) of the target vehicle speed selector 46B which is operable by the driver and the tilt G of the vehicle detected by the tilt sensor 44 based on the map shown in the block of step 520 in FIG. 5.

In step 530, the CPU generates a driving force request value (second driving force request value) EGReqTqC to be requested to the engine 21 so that the vehicle speed SPD will be equal to the target vehicle speed TSV. That is, as described before, the CPU reduces the driving force request value EGReqTqC so as to reduce the vehicle driving force if the vehicle speed SPD is higher than the target vehicle speed TSV, and increases the driving force request value EGReqTqC so as to increase the vehicle driving force if the vehicle speed SPD is lower than the target vehicle speed TSV.

In step 540, the CPU converts the target vehicle speed TSV into a wheel speed by multiplying the target vehicle speed TSV by a constant k, and generates a target wheel speed TBV by adding a predetermined value $\alpha$, which is equal to or greater than 0, to the wheel speed as described before. In step 550, the CPU compares each of the actual wheel speeds Vw (that is, VwFR, VwFL, VwRR and VwRL) with the target wheel speed TBV and causes the hydraulic pressure circuit 33 to generate temporary braking hydraulic pressures PwC to be applied to the wheels as described before. That is, the CPU increases the temporary braking hydraulic pressures PwC on the wheels with a wheel speed Vw which is equal to or higher than the target wheel speed TBV. Also, the CPU reduces the temporary braking hydraulic pressures PwC on the wheels with a wheel speed Vw which is lower than the target wheel speed TBV. Then, the CPU proceeds to step 590 and terminates the current routine.

The CPU also starts an operation in step 600 in FIG. 6 at a predetermined time, and determines whether or not the constant speed traveling control condition flag Xc is "1" in step 610. In this case, since the constant speed traveling control condition flag Xc is "1," the CPU proceeds to step 620.

In step 620, the CPU determines whether or not the termination conditions of the constant speed traveling control are satisfied. The termination conditions of the constant speed traveling control are satisfied when either a condition A1 (the constant speed traveling control switch 46A is turned off by the driver) or a condition A2 (it is determined that the first control device does not operate normally as a result of an abnormal diagnosis) is satisfied when the constant speed traveling control conditions are satisfied.

In this case, let it be assumed that the constant speed traveling control has just started and the termination conditions of the constant speed traveling control are not satisfied. Thus, the CPU proceeds from step 620 directly to step 690, and terminates the current routine. As a result, since step 630 to set the constant speed traveling control condition flag Xc to "0" is not performed, the constant speed traveling control condition flag Xc is maintained at "1." Also, since step 640 to set the backup control condition flag XB to "1" is not performed, the backup control condition flag XB is maintained at "0."

The CPU also starts an operation in step 700 in FIG. 7 at a predetermined time, and determines whether or not a backup control condition flag XB is "1" in step 710. In this case, since the backup control condition flag XB is "0," the CPU proceeds from step 710 directly to step 790, and terminates the current routine.

The CPU also starts an operation in step 800 in FIG. 8 at a predetermined time, and generates a normal time driving force request value EGReqTqN in step 810. Then, in the following step 820, the CPU determines whether or not the constant speed traveling control condition flag Xc is "1." In this case, since the constant speed traveling control condition flag Xc is "1," the CPU proceeds to step 860.

In step 860, the CPU sets the output driving force request value EGReqTqF to be finally output to the driving force request value EGReqTqC generated in step 530 in FIG. 5 or the normal time driving force request value EGReqTqN generated in step 810, whichever is greater. Then, the CPU proceeds to step 890 through step 850, and terminates the current routine. Therefore, the opening of the throttle valve 21b is controlled so that the output torque of the engine 21 will be equal to the output driving force request value EGReqTqF.

The CPU also starts an operation in step 900 in FIG. 9 at a predetermined time, and acquires the master cylinder pressure Pm as a normal time braking hydraulic pressure PwN in step 910. Next, the CPU proceeds to step 920, and determines whether or not the constant speed traveling control condition flag Xc is "1." In this case, since the constant speed traveling control condition flag Xc is "1," the CPU proceeds to step 960.

In step 960, the CPU determines whether or not the average PwAV of the temporary braking hydraulic pressures PwC on the wheels generated by the hydraulic pressure circuit 33 in step 550 in FIG. 5 or step 750 in FIG. 7, which is described later, is greater than the normal time braking hydraulic pressure PwN acquired in step 910. In this case, if the average PwAV of the temporary braking hydraulic pressures PwC is greater than the normal time braking hydraulic pressure PwN, the CPU proceeds to step 970 and sets the temporary braking hydraulic pressure PwC on each wheel to the output braking hydraulic pressure PwF for the wheel. Then, the CPU proceeds to step 990 through step 950, and terminates the current routine. Therefore, the hydraulic pressure circuit 33 is controlled so that the hydraulic pressures to be applied to the wheel cylinders 41FR to 41RL of the wheels will be equal to the output braking hydraulic pressures PwF for the corresponding wheels.

If the average PwAV of the temporary braking hydraulic pressures PwC is equal to or lower than the normal time braking hydraulic pressure PwN, the CPU selects "No" in step 960 and proceeds to step 940, where the CPU sets the output braking hydraulic pressures PwF to be finally output to the normal time braking hydraulic pressure PwN. Therefore, the hydraulic pressure circuit 33 is controlled so that the hydraulic pressures to be applied to the wheel cylinders 41FR to 41RL of the wheels will be equal to the normal time braking hydraulic pressure PwN.

As described above, according to the first control device, when the constant speed traveling control start conditions are satisfied during normal control, constant speed traveling control is started to control the vehicle driving force and the vehicle braking force so that the vehicle speed SPD will be equal to the target vehicle speed TSV. In the constant speed traveling control, a driving force request value EGReqTqC to reduce the vehicle driving force is generated if the vehicle speed SPD is higher than the target vehicle speed TSV, and a driving force request value EGReqTqC to increase the vehicle driving force is generated if the vehicle speed SPD is lower than the target vehicle speed TSV. In addition, in the constant speed traveling control, the temporary braking hydraulic pressures PwC on the wheels with a wheel speed Vw which is higher than the target wheel speed TBV are increased and the temporary braking hydraulic pressures PwC on the wheels with a wheel speed Vw which is lower than the target wheel speed TBV are decreased. Therefore, the vehicle braking force is changed so that the vehicle speed SPD is equal to the target vehicle speed TSV.

Then, a torque corresponding to "the generated driving force request value EGReqTqC" is output from the engine 21, and "the temporary braking hydraulic pressures PwC generated for each of the wheels" are applied to the wheel cylinders 41FR to 41RL of the wheels during the constant speed traveling control. However, if the normal time driving force request value EGReqTqN corresponding to the displacement Ap of the accelerator pedal 47 is equal to or greater than the driving force request value EGReqTqC generated for the constant speed traveling control, a torque corresponding to the normal time driving force request value EGReqTqN is output from the engine 21. Also, if the normal time braking hydraulic pressure PwN based on the master cylinder pressure Pm is equal to or greater than the average PwAV of the temporary braking hydraulic pressures PwC for the wheels generated for the constant speed traveling control, the normal time braking hydraulic pressure PwN is applied to the wheel cylinders 41FR to 41RL of the wheels. Therefore, vehicle control based on the accelerating operation and braking operation performed by the driver can be carried out.

The case where the termination conditions of the constant speed traveling control are satisfied during constant speed traveling control is next described. The termination conditions of the constant speed traveling control are satisfied when the constant speed traveling control switch 46A is switched off by the driver or it is determined that the first control device does not operate normally as a result of an abnormal diagnosis. In the following, the description is split into the case where the termination conditions of the constant speed traveling control are satisfied when the amounts of accelerating operation and braking operation performed by the driver are both zero, and the case where the termination conditions of the constant speed traveling control are satisfied when the amount of the accelerating operation or braking operation performed by the driver is not zero.

In Case where Termination Conditions of the Constant Speed Traveling Control are Satisfied when Amounts of Accelerating Operation and Braking Operation Performed by Driver are Both Zero The CPU starts an operation in step 400 in FIG. 4 at a predetermined time. In this case, since the constant speed traveling control condition flag Xc is "1," the CPU selects "No" in step 410, and proceeds directly to step 490, where the CPU terminates the current routine.

The CPU starts an operation in step 500 in FIG. 5 at a predetermined time. In this case, since the constant speed traveling control condition flag Xc is "1," the CPU selects "Yes" in step 510 and performs step 520 to step 550. Therefore, a driving force request value EGReqTqC, a target wheel speed TBV and so on are generated.

The CPU starts an operation in step 600 in FIG. 6 at a predetermined time. In this case, since the constant speed traveling control condition flag Xc is "1," the CPU selects "Yes" in step 610 and proceeds to step 620.

In step 620, the CPU determines whether or not the termination conditions of the constant speed traveling control are satisfied. Based on the assumption described before, the termination conditions of the constant speed traveling control have just been satisfied. Thus, the CPU selects "Yes" in step 620, and sequentially performs step 630 to step 660. In step 630, the CPU sets the constant speed traveling control condition flag Xc to "0." This time (the time at which the constant speed traveling control conditions are changed from satisfied state to unsatisfied state when the amounts of accelerating operation and braking operation performed by the driver are both zero) is the "specific control termination time" described before. In step 640, the CPU sets the backup control condition flag XB to "1." In step 650, the CPU acquires the driving force request value EGReqTqC at the specific control termination time (=EGReqTq0) as the driving force request value EGReqTqC(n−1) in the previous cycle, i.e. the cycle immediately before the current cycle. In step 660, the CPU acquires the target wheel speed TBV at the specific control termination time (=TBV0) as the target wheel speed TBV(n−1) in the previous cycle, i.e. the cycle immediately before the current cycle. Then, the CPU proceeds to step 690 and terminates the current routine.

The CPU also starts an operation in step 700 in FIG. 7 at a predetermined time, and determines whether or not a backup control condition flag XB is "1" in step 710. The backup control condition flag XB has been changed to "1" in step 640. Thus, the CPU selects "Yes" in step 710 and proceeds to step 720.

The CPU determines whether or not the driving force request value EGReqTqC(n−1) in the previous cycle is equal to or smaller than "0" in step 720. Here, the value "0" to be compared with the driving force request value EGReqTqC (n−1) is the normal time driving force request value EGReqTqN, which is "0" at this moment since the amount of accelerating operation is "0."

If the driving force request value EGReqTqC immediately after the termination conditions of the constant speed traveling control are satisfied is higher than "0" because the vehicle is traveling on an uphill grade or some other reason, that is, if the driving force request value EGReqTqC(n−1) acquired at the specific control termination time in step 650 is higher than "0," the CPU selects "No" in step 720 and proceeds to step 730.

The CPU sets the target wheel speed TBV(n−1) in the previous cycle as the current target wheel speed TBV(n) in step 730. That is, the target wheel speed TBV is maintained at the target wheel speed TBV at the specific control termination time (=TBV0). Then, the CPU proceeds to step 740.

The CPU sets a value obtained by subtracting a predetermined driving force decrease amount TQDW (>0) from the driving force request value EGReqTqC(n−1) in the previous cycle as the current driving force request value EGReqTqC (n) (that is, EGReqTqC in step 860) in step 740.

Next, the CPU proceeds to step 750, and generates temporary braking hydraulic pressures PwC for the wheels by comparing each of the actual wheel speeds Vw with the target wheel speed TBV(n) in the same manner as in step 550.

Then, the CPU proceeds to step 760 and determines whether or not backup control termination conditions are satisfied by determining whether or not either a condition B1 (the driving force request value EGReqTqC(n) is equal to or smaller than "0" and the temporary braking hydraulic pressures PwC on all the wheels are "0") or a condition B2 (an accelerating operation or braking operation was performed by the driver) is satisfied.

In this case, since backup control has just started (that is, XB has been just changed to 1) while neither an accelerating operation nor a braking operation is not performed, neither the condition B1 nor the condition B2 is satisfied. Thus, the CPU proceeds from step 760 directly to step 790, and terminates the current routine. As a result, since step 780 to set the backup control condition flag XB to "0" is not performed, the backup control condition flag XB is maintained at "1."

The CPU also starts an operation in step 800 in FIG. 8 at a predetermined time, and proceeds through step 810, step 820 and step 830 to step 860, where the CPU generates an output driving force request value EGReqTqF. Then, the CPU proceeds to step 890 through step 850 and terminates the current routine. Therefore, the opening of the throttle valve 21*b* is controlled so that the output torque of the engine 21 will be equal to the output driving force request value EGReqTqF. As a result, the torque the engine 21 outputs decreases by an amount corresponding to the driving force decrease amount TQDW.

The CPU also starts an operation in step 900 in FIG. 9 at a predetermined time, and proceeds to step 960 through step 910, step 920 and step 930. In this case, a braking operation is not performed, the average PwAV of the temporary braking hydraulic pressures PwC is greater than the normal time braking hydraulic pressure PwN. Thus, the CPU selects "Yes" in step 960 and proceeds through step 970 and step 950 to step 990, where the CPU terminates the current routine. Therefore, the hydraulic pressure circuit 33 is controlled so that the wheel cylinders 41FR to 41RL of the wheels will have the corresponding output braking hydraulic pressures PwF (in this case, the temporary braking hydraulic pressures PwC for the wheels generated in step 750).

After that, the CPU repeats step 730 and step 740 until "Yes" is selected in step 720 (that is, until the driving force request value EGReqTqC(n−1) becomes "0" or smaller). As a result, the target wheel speed TBV is maintained at the target wheel speed TBV at the specific control termination time (=TBV0), and the driving force request value EGReqTqC is reduced by the predetermined driving force decrease amount TQDW every time the routine in FIG. 7 is executed until the driving force request value EGReqTqC becomes "0" or smaller.

As described above, according to the first control device of one aspect of the present invention, when the termination conditions of the constant speed traveling control are satisfied during constant speed traveling control, backup control is performed so that the vehicle propulsive force will be equal to or lower than the vehicle propulsive force at the specific control termination time. That is, in the backup control, the driving force request value EGReqTqC is preferentially reduced until it becomes "0" or smaller so as to reduce the vehicle driving force. In addition, the target wheel speed TBV is maintained at the target wheel speed TBV at the specific control termination time (=TBV0) and the constant speed traveling control is continued until the driving force request value EGReqTqC becomes "0" or smaller.

Thus, since the vehicle braking force is controlled so that the target wheel speed TBV is maintained at the target wheel speed TBV at the specific control termination time (=TBV0), the vehicle braking force is also reduced gradually from the vehicle braking force at the specific control termination time toward "0" with the decrease in the vehicle driving force.

After that, when the driving force request value EGReqTqC(n−1) becomes "0" or smaller, the CPU selects "Yes" in step 720 when it proceeds to step 720, and proceeds to step 770.

Then, the CPU sets a value obtained by adding a predetermined target wheel speed increase amount TBVUP to the target wheel speed TBV(n−1), i.e., the target wheel speed in the previous cycle, as a current target wheel speed TBV(n) in step 770. That is, the CPU gradually increases the target wheel speed TBV from the target wheel speed TBV at the specific control termination time (=TBV0).

Next, the CPU proceeds to step 760 through step 750, and determines whether or not the backup control termination conditions are satisfied. Here, if there still is a wheel on which a braking hydraulic pressure Pw higher than "0" is applied, the CPU selects "No" in step 760 and proceeds to step 790, where the CPU terminates the current routine.

As described above, according to the first control device, the backup control termination conditions are not satisfied and the driving force request value EGReqTqC(n−1) becomes "0" or smaller during backup control, the target wheel speed TBV is gradually increased from the target wheel speed TBV at the specific control termination time (=TBV0). Therefore, the CPU gradually reduces the vehicle braking force from the vehicle braking force at the specific control termination time toward "0."

Since the backup control is performed, the condition B1 is satisfied when the time when the driving force request value EGReqTqC(n) is "0" or smaller and the braking hydraulic pressures PwC on all the wheels reach "0" comes. At this time, the CPU selects "Yes" in step 760 and sequentially performs the following step 780 and step 785. In step 780, the CPU sets the backup control condition flag XB to "0." In step 785, the CPU changes the driving force request value EGReqTqC(n) (=EGReqTqC) to "0." In addition, the CPU changes the temporary braking hydraulic pressures PwC to "0." Then, the CPU proceeds to step 790 and terminates the current routine.

When an accelerating operation or braking operation is performed during backup control, the condition B2 is satisfied. At this time, the CPU selects "Yes" in step 760, and sequentially performs step 780 and step 785. Then, the CPU proceeds to step 790 and terminates the current routine.

As described above, according to the first control device, when the backup control termination conditions are satisfied during backup control because the driving force request value EGReqTqC(n) is "0" or smaller and the braking hydraulic pressures PwC on all the wheels reach "0," or the driver performs an accelerating operation or a braking operation, the backup control condition flag XB is changed to "0" and the vehicle returns to the normal control mode.

When the backup control termination conditions are satisfied because the driver performs an accelerating operation, for example, the temporary braking hydraulic pressures PwC generated in step 750 may still remain. Even in such a case, since the temporary braking hydraulic pressures PwC are changed to "0" in step 785, smooth acceleration of the vehicle is not impeded. Thus, the driver does not feel any discomfort.

In Case where Termination Conditions of the Constant Speed Traveling Control are Satisfied when Amount of Accelerating Operation or Braking Operation Performed by Driver is not Zero In this case, since the condition B2 is satisfied immediately, the CPU selects "Yes" in step 760 and sequentially performs step 780 and step 785. Then, the CPU proceeds to step 790 and terminates the current routine. Thus, the backup control condition flag XB is set to "0," the driving force request value EGReqTqC(n) is changed to "0," the temporary braking hydraulic pressures PwC are changed to "0," and normal control is performed. That is, a torque corresponding to the amount of accelerating operation performed by the driver is output from the engine 21 quickly, and braking hydraulic pressures Pw corresponding to the amount of braking operation performed by the driver are applied to the wheel cylinders 41FR to 41RL of the wheels.

Step 810 of the drive torque control routine shown in FIG. 8 in the first embodiment corresponds to a first driving force request value generation device. Also, the master cylinder 32, the hydraulic pressure circuit 33 and step 910 of the braking hydraulic pressure control routine shown in FIG. 9 correspond to a first braking force control amount generation device.

In addition, step 530 of the constant speed traveling control routine shown in FIG. 5 corresponds to a second driving force request value generation device, and step 550 in FIG. 5 and step 750 in FIG. 7 correspond to a second braking force control amount generation device.

Further, step 720, step 730, step 740, step 750 and step 770 of the backup control routine shown in FIG. 7, the routine shown in FIG. 8 and the routine shown in FIG. 9 correspond to a vehicle propulsive force control device. Among them, step 720, step 740 and the routine of FIG. 8 correspond to a first control termination time control device and a driving force change device, and step 720, step 730, step 750, step 770 and the routine shown in FIG. 9 correspond to a second control termination time control device and a braking force change device.

As described above, according to the first control device, the target wheel speed TBV is maintained at the target wheel speed TBV at the specific control termination time (=TBV0) until the driving force request value EGReqTqC(n−1) set in the previous cycle becomes "0" or smaller. Thus, the vehicle braking force can be changed so that the vehicle speed does not exceed the vehicle speed at the specific control termination time until the driving force request value EGReqTqC(n−1) set in the previous cycle becomes "0" or smaller. In other words, since the value of a "vehicle propulsive force," which takes a positive value when acting in the same direction as the vehicle driving force and takes a negative value when acting in an opposite direction of the vehicle driving force and which has a magnitude equal to a value resulting from subtracting the magnitude of the vehicle braking force from the magnitude of the vehicle driving force, is controlled to be equal to or smaller than "the value of the vehicle propulsive force at the specific control termination time," the vehicle driving force can be reliably prevented from becoming excessive relative to the vehicle braking force. As a result, a situation does not occur in which the vehicle accelerates even though the driver is not performing an accelerating operation when, for example, the vehicle is traveling on an uphill grade, and the driver does not feel any discomfort.

Modification of First Embodiment

A vehicle control device according to a modification of the first embodiment of the present invention (which is hereinafter referred to as "first modification") is described with reference to the time charts shown in FIG. 10A and FIG. 10B. In the following, the wheels in a higher position of the front wheels and rear wheels of the vehicle are referred to as "upside wheels" and the wheels in a lower position of the front wheels and rear wheels of the vehicle are referred to as "downside wheels" regardless of whether the vehicle is running forward or backward.

The vehicle control device according to the first modification is different from the vehicle control device according to the first embodiment in that the vehicle control device produces braking forces so that the wheel braking force to be applied to the upside wheels and the wheel braking force to be applied to the downside wheels are different when constant speed traveling control is performed. In the following description, emphasis is placed on the difference.

Figure 10A:
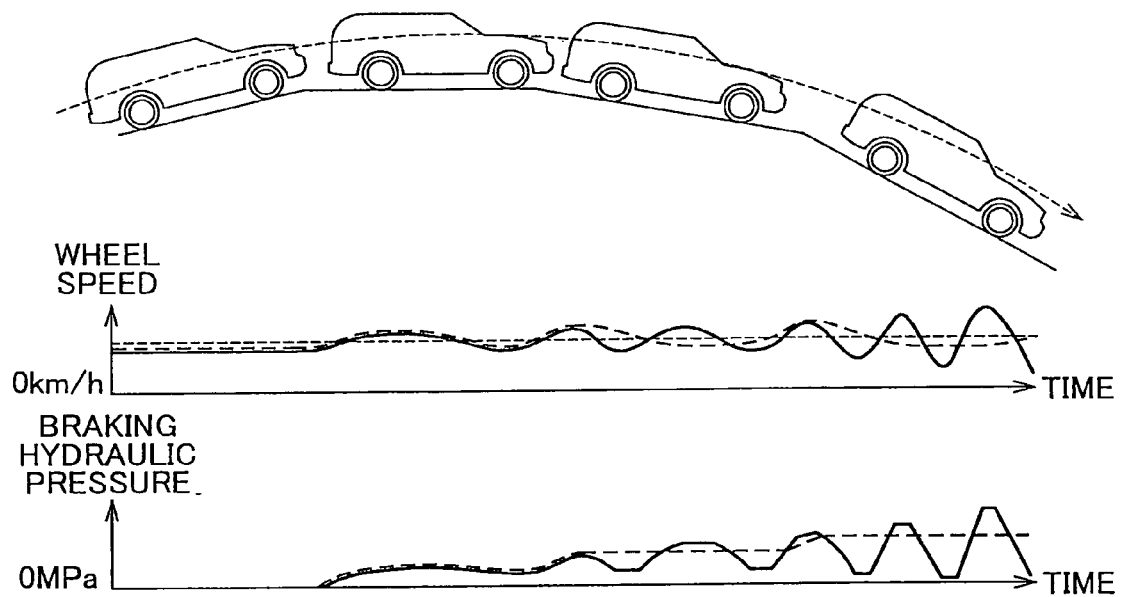
FIG. 10A is graphs showing changes in wheel speed and target wheel speed, and braking hydraulic pressures, respectively, in the case where a vehicle is traveling on an downhill grade and in the case of a conventional vehicle control device.
Figure 10B:
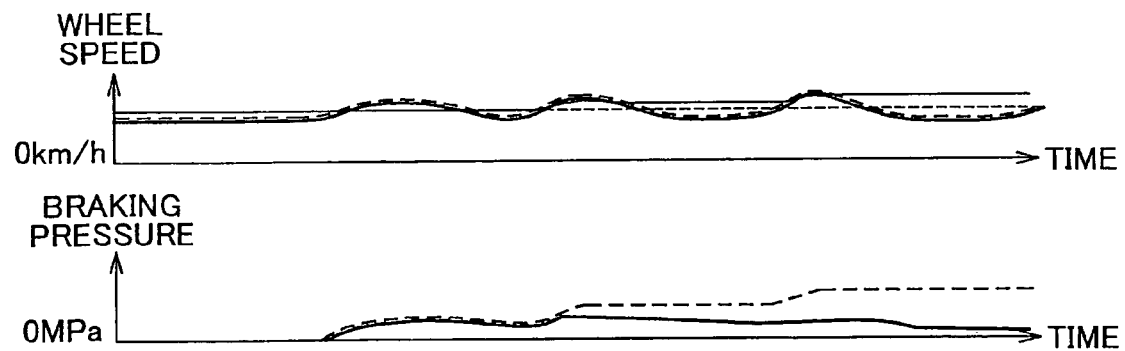
FIG. 10B is graphs showing changes in wheel speed and target wheel speeds, and braking hydraulic pressures, respectively, in the case where a vehicle is traveling on an downhill grade and in the case of a vehicle control device according to a first modification of one aspect of the present invention.

FIG. 10A is a time chart showing the operation of the vehicle control device according to the first embodiment, and FIG. 10B is a time chart showing the operation of the vehicle control device according to the first modification. In FIG. 10A and FIG. 10B, the horizontal axis represents the elapse of time, and the vertical axes represent, from the top, changes in wheel speed and braking hydraulic pressure. The solid-line wheel speed curve represents the actual wheel speed of an upside wheel of the vehicle, and the solid-line braking hydraulic pressure curve represents the actual braking hydraulic pressure on an upside wheel of the vehicle. The broken-line wheel speed curve represents the actual wheel speed of a downside wheel of the vehicle, and the broken-line braking hydraulic pressure curve represents the actual braking hydraulic pressure on an upside wheel of the vehicle. The fine-line wheel speed curves represent the target wheel speeds. That is, the fine solid-line wheel speed curve represents the target wheel speed for the upside wheels of the vehicle, and the fine broken-line wheel speed curve represents the target wheel speed for the downside wheels of the vehicle.

In the constant speed traveling control of the first embodiment, the same target wheel speed TBV which is used for all the wheels when the wheel braking force is controlled. However, when the vehicle is running on a grade, the load on the upside wheels of the vehicle is smaller than the load on the downside wheels of the vehicle. Thus, when braking forces are applied to the wheels so that the wheel speed of the upside wheels and the wheel speed of the downside wheels is equal to the same target wheel speed, the upside wheels tend to slip.

Therefore, the vehicle control device according to the first modification determines the upside wheels and downside wheels based on the tilt G detected by the tilt sensor 44. In addition, the vehicle control device according to the first modification uses a target wheel speed TBVds for downside wheels and a target wheel speed TBVus for upside wheels, which is higher than the target wheel speed TBVds for downside wheels, instead of the target wheel speed TBV used to control the wheel braking force in the vehicle control device according to the first embodiment. In other words, the vehicle control device according to the first modification controls the braking forces so that the wheel braking force on the upside wheels will be lower than the wheel braking force on the downside wheels.

More specifically, when braking forces are applied to the upside wheels and the downside wheels so that the upside wheels and the downside wheels will reach the same target wheel speed, the upside wheels may slip as indicated by solid lines in FIG. 10A. On the contrary, according to the vehicle control device of the first modification of the present invention, the target wheel speed TBVus for the upside wheels is set to a higher value than the target wheel speed TBVds for the downside wheels as shown in FIG. 10B. Therefore, since the wheel braking forces on the upside wheels become smaller relative to the wheel braking forces on the downside wheels, the upside wheels are prevented from slipping. As a result, even if constant speed traveling control is performed when the vehicle is running on a slope, the behavior of the vehicle does not become unstable.

The details of the operation of the vehicle control device according to the first modification are described with reference to a flowchart.

Figure 11:
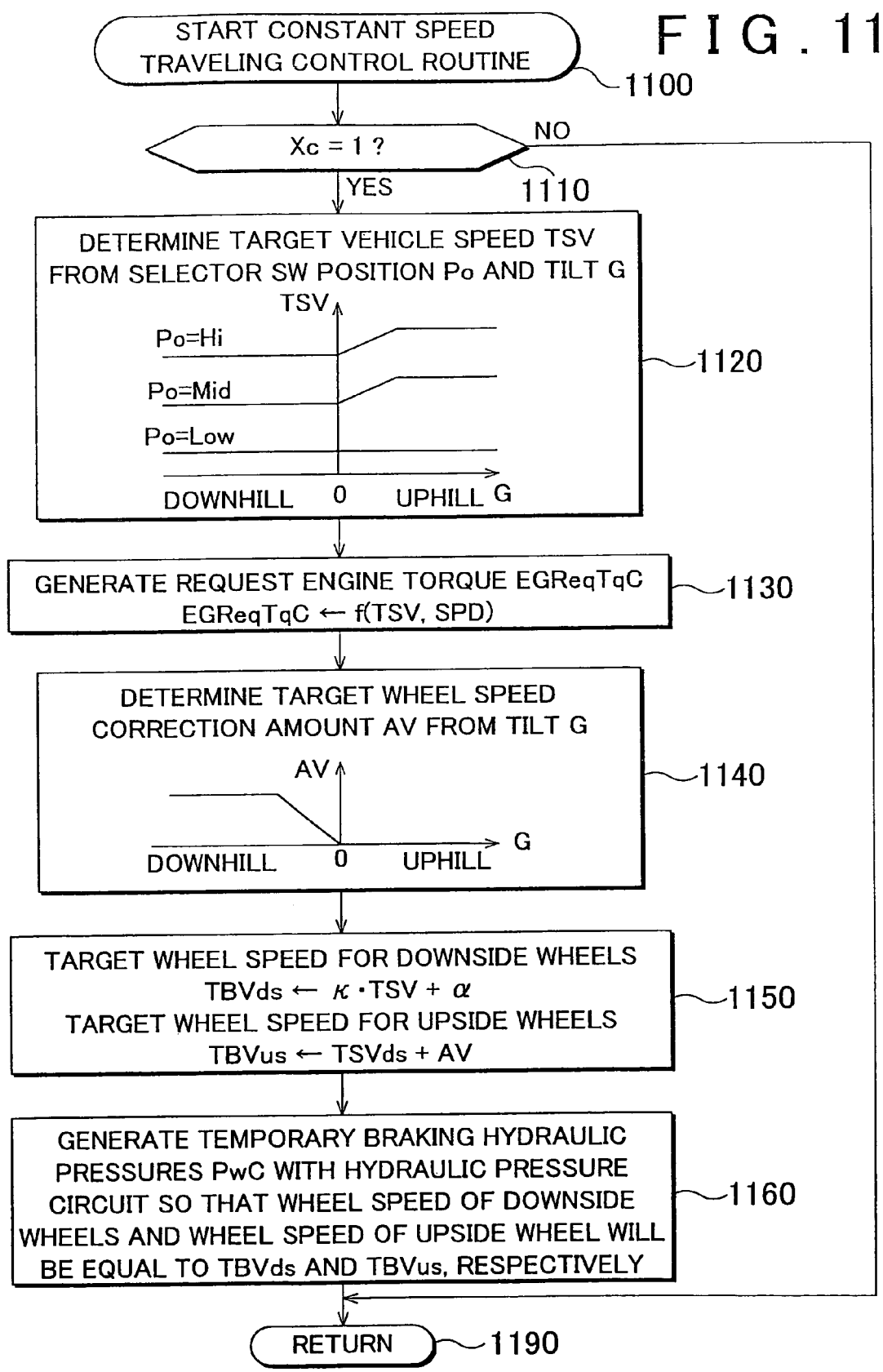
FIG. 11 is a flowchart showing a constant speed traveling control routine in a modification of the first embodiment of the present invention.

The vehicle control device according to the first modification is different from the vehicle control device according to the first embodiment only in that the constant speed traveling control routine shown in FIG. 11 is used instead of the constant speed traveling control routine shown in FIG. 5.

The CPU of the vehicle control device according to the first modification repeatedly executes the routine shown in FIG. 11 at regular intervals. Thus, the CPU proceeds to step 1110 at a predetermined time, and determines whether or not the constant speed traveling control conditions are satisfied. Here, if the constant speed traveling control conditions are not satisfied, that is, when the constant speed traveling control condition flag Xc has been set to "0," the CPU proceeds directly to step 1190 and terminates the current routine. If the constant speed traveling control conditions are satisfied, that is, when the constant speed traveling control condition flag Xc has been set to "1," the CPU sequentially performs step 1120 to step 1160 described below.

In step 1120, the CPU determines a target vehicle speed TSV from the position (Hi, Mid or Low) of the target vehicle speed selector 46B which is operable by the driver and the tilt G of the vehicle detected by the tilt sensor 44 based on the map shown in the block of step 1120 in the same manner as in step 520 in FIG. 5.

In step 1130, the CPU generates a driving force request value EGReqTqC based on the target vehicle speed TSV and the vehicle speed SPD in the same manner as in step 530 in FIG. 5. In step 1140, the CPU determines a target wheel speed correction amount AV (AV≧0) using the map shown in the block of step 1140 and the tilt G of the vehicle. In the map, the target wheel speed correction amount AV is defined such that it is "0" when the vehicle is traveling on an uphill grade (G≧0), and increases in proportion to the increase in |G| and is constant in the range in which |G| is equal to or greater than a predetermined value when the vehicle is traveling on a downhill grade (G<0).

In step 1150, the CPU converts the target vehicle speed TSV into a wheel speed by multiplying the target vehicle speed TSV by a constant k, and generates a target wheel speed TBVds for the downside wheels by adding a predetermined value a, which is equal to or greater than 0, to the wheel speed. Also, the CPU generates a target wheel speed TBVus for the upside wheels by adding the target wheel speed correction amount AV determined in step 1140 to the target wheel speed TBVds for the downside wheels.

In step 1160, the CPU determines the upside wheels based on the tilt G detected by the tilt sensor 44, and generates temporary braking hydraulic pressures PwCus for the upside wheels by comparing the actual wheel speed Vw of each of the upside wheels with the target wheel speed TBVus for the upside wheels. Similarly, the CPU generates temporary braking hydraulic pressures PwCds for the downside wheels by comparing the actual wheel speed Vw of each of the downside wheels with the target wheel speed TBVds for the downside wheels. Then, the CPU proceeds to step 1190 and terminates the current routine.

As described above, according to the control device of the first modification of the present invention, the target wheel speed TBVus for the upside wheels is set to a value greater by the target wheel speed correction amount AV than the target wheel speed TBVds for the downside wheels, the wheel braking forces on the upside wheels become smaller than the wheel braking forces on the downside wheels. Therefore, the upside wheels are prevented from slipping. As a result, even if constant speed traveling control is performed when the vehicle is running on a grade (in particular, a downhill grade), the behavior of the vehicle does not become unstable.

Second Embodiment

A vehicle control device according to a second embodiment of the present invention (which is hereinafter referred to as "second control device") is described with reference to the time charts shown in FIG. 12A and FIG. 12B. The second control device is different from the first control device in reducing the output torque the engine 21 produces gradually toward a force corresponding to the amount of accelerating operation after the specific control termination time and maintaining the force that the brake system produces at a force that the brake system is producing at the specific control termination time until the output torque reaches a force corresponding to the amount of accelerating operation performed by the driver. In the following description, emphasis is placed on the difference.

FIG. 12A is a time chart showing the operation of a conventional vehicle control device, and FIG. 12B is a time chart showing the operation of the second control device. In FIG. 12A and FIG. 12B, the horizontal axis represents the elapse of time, and the vertical axes represent, from the top, changes in braking hydraulic pressure and driving force request value. The heavy-line of the braking hydraulic pressure curve represents the braking hydraulic pressure on a wheel which is not slipping, and the fine-line of the braking hydraulic pressure curve represents the braking hydraulic pressure on a wheel which is slipping. In this example, the driver is performing neither an accelerating operation nor a braking operation.

When the specific control termination time (the time t1 in FIG. 12A and FIG. 12B) comes, the CPU of the second control device records (stores) the output driving force request value EGReqTqF at the specific control termination time (which is equal to the driving force request value EGReqTqC in this case) and the output braking hydraulic pressures PwF at the specific control termination time (which are equal to the corresponding temporary braking hydraulic pressures PwC in this case) in the RAM, and starts backup control.

In the backup control, the CPU gradually reduces the driving force request value EGReqTqC toward a value corresponding to the amount of accelerating operation performed by the driver (at the same predetermined driving force reduction rate as in the first control device, for example) so as to reduce the vehicle driving force. In this case, since the driver is performing neither an accelerating operation nor a braking operation, "the value corresponding to the amount of accelerating operation performed by the driver" is "0." Therefore, the driving force request value EGReqTqC reaches "0" at a time t2 in FIG. 12B.

Also, the CPU maintains the temporary braking hydraulic pressures PwC at the braking hydraulic pressures PwC at the specific control termination time (that is, the output braking hydraulic pressures PwF stored in the RAM) until the driving force request value EGReqTqC reaches a value corresponding to the amount of accelerating operation performed by the driver (that is, until the time t2 in FIG. 12B). As a result, the output braking hydraulic pressures PwF are maintained at the output braking hydraulic pressures PwF at the specific control termination time.

When the driving force request value EGReqTqC becomes "0" or smaller, the CPU reduces the temporary braking hydraulic pressures PwC toward a value corresponding to the amount of braking operation, i.e., "0." Therefore, the output braking hydraulic pressures PwF decrease and, consequently, the vehicle braking force decreases.

As described above, according to the second control device, the braking hydraulic pressures to be applied to the wheel cylinders of the wheels are maintained at the braking hydraulic pressures at the specific control termination time from the specific control termination time to the time when the driving force request value reaches "0." In other words, according to the second control device, the vehicle braking force that the brake system produces is maintained at the vehicle braking force at the specific control termination time until the force that the driving source produces reaches "0."

Therefore, since the value of the vehicle propulsive force is controlled to be equal to or lower than the value of the vehicle propulsive force at the specific control termination time, the vehicle driving force is reliably prevented from becoming excessive relative to the vehicle braking force. As a result, a situation does not occur in which the vehicle accelerates even though the driver is not performing an accelerating operation when, for example, the vehicle is traveling on an uphill grade, and the driver does not feel any discomfort.

Third Embodiment

A vehicle control device according to a third embodiment of the present invention (which is hereinafter referred to as "third control device") is described with reference to the time charts shown in FIG. 13A and FIG. 13B. The third control device is different from the first control device in gradually reducing the force that the brake system produces to a force corresponding to the amount of braking operation performed by the driver in such a manner that the reduction rate of the vehicle braking force is always lower than a predetermined vehicle driving force reduction rate after the specific control termination time. In the following description, emphasis is placed on the difference.

Figure 13A:
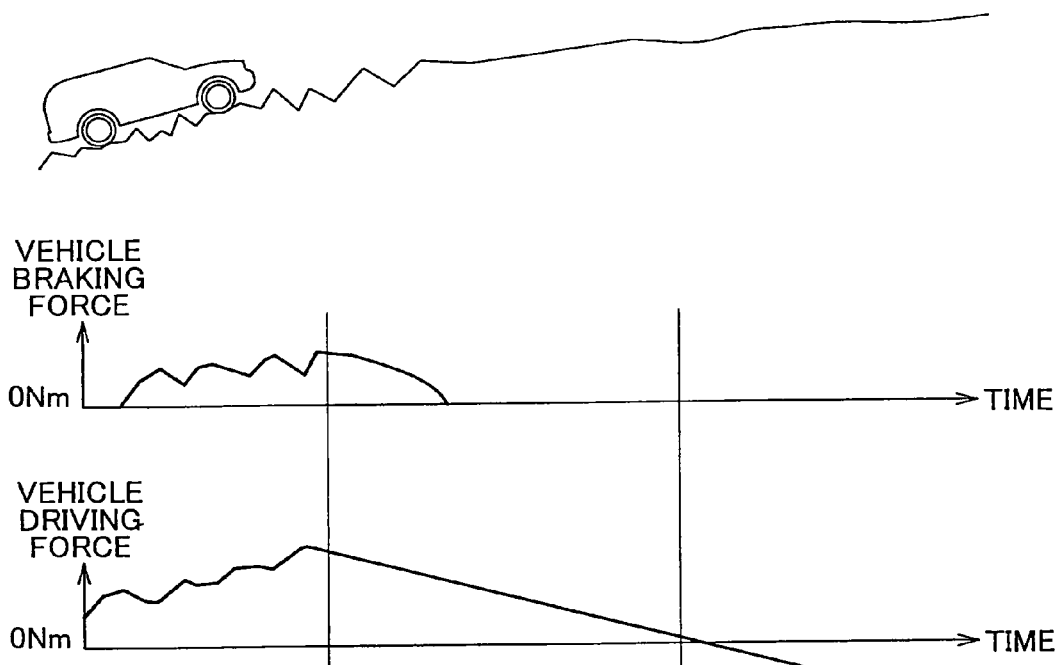
FIG. 13A is graphs showing changes in vehicle braking force and driving force request value, respectively, in the case where a vehicle is traveling on an uphill grade and in the case of a conventional vehicle control device.
Figure 13B:
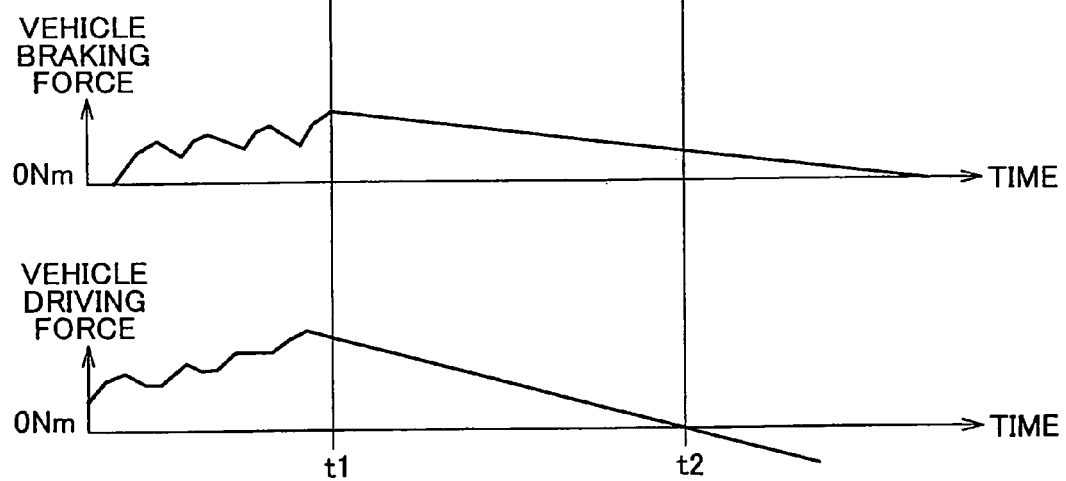
FIG. 13B is graphs showing changes in vehicle braking force and driving force request value, respectively, in the case where a vehicle is traveling on an uphill grade and in the case of a third control device according to one aspect of the present invention.

FIG. 13A is a time chart showing the operation of a conventional vehicle control device, and FIG. 13B is a time chart showing the operation of the third control device. In FIG. 13A and FIG. 13B, the horizontal axis represents the elapse of time, and the vertical axes represent, from the top, changes in vehicle braking force and vehicle driving force. In this example, the driver is performing neither an accelerating operation nor a braking operation.

When the specific control termination time (the time t1 in FIG. 13A and FIG. 13B) comes, the CPU of the third control device starts backup control. In the backup control, the CPU gradually reduces the driving force request value EGReqTqC to a value corresponding to the amount of accelerating operation performed by the driver in such a manner that the reduction rate of the vehicle driving force is equal to a predetermined driving force reduction rate. In this case, since the driver is performing neither an accelerating operation nor a braking operation, "the value corresponding to the amount of accelerating operation performed by the driver" is "0." Therefore, the vehicle driving force reaches "0" at a time t2 in FIG. 13B.

Also, the CPU gradually reduces the temporary braking hydraulic pressures PwC toward a normal time braking hydraulic pressure PwN corresponding to the amount of braking operation performed by the driver, i.e., "0," in such a manner that the vehicle braking force is reduced at a braking force reduction rate which is always lower than the reduction rate of the driving force. As a result, while the driving force request value EGReqTqC is being reduced toward "0," the output braking hydraulic pressures PwF are gradually reduced toward "0" in such a manner that the amount of change (amount of decrease) in the vehicle braking force from the specific control termination time to a given point in time does not exceed the amount of change (amount of decrease) in the vehicle driving force from the specific control termination time to the given point in time.

As described above, according to the third control device, the vehicle driving force, which is greater than the vehicle braking force when, for example, the vehicle 10 is traveling on an uphill grade (that is, the greater of the vehicle driving force and the vehicle braking force), is reduced gradually toward the vehicle driving force corresponding to the amount of accelerating operation performed by the driver at a driving force reduction rate as a predetermined reduction rate. In addition, the vehicle braking force is reduced gradually toward the vehicle driving force corresponding to the amount of braking operation performed by the driver at a braking force reduction rate which is always lower than the driving force reduction rate. In other words, the vehicle braking force is reduced gently in such a manner that the amount of decrease in the vehicle braking force is always smaller than the amount of decrease in the vehicle driving force.

Therefore, since the value of the vehicle propulsive force is controlled to be equal to or lower than the value of the vehicle propulsive force at the specific control termination time, the vehicle driving force is reliably prevented from becoming excessive relative to the vehicle braking force. As a result, a situation does not occur in which the vehicle accelerates even though the driver is not performing an accelerating operation when, for example, the vehicle is traveling on an uphill grade, and the driver does not feel any discomfort.

As described above, according to the first to third embodiments of the present invention, when the specific control termination time comes, the vehicle driving force is changed toward a force corresponding to the amount of accelerating operation performed by the driver.

Then, the vehicle braking force is reduced to a force corresponding to the amount of braking operation performed by the driver after the specific control termination time so that the value of "the vehicle propulsive force," which takes a positive value when acting in the same direction as the vehicle driving force and takes a negative value when acting in the opposite direction of the vehicle driving force and which has a magnitude equal to a value resulting from subtracting the magnitude of the vehicle braking force from the magnitude of the vehicle driving force, will be equal to or smaller than the value of "the vehicle propulsive force at the specific control termination time."

In other words, the vehicle driving force, which is greater than the vehicle braking force when, for example, the vehicle 10 is traveling on an uphill grade (that is, the vehicle driving force as a "first force," which is the greater of the vehicle driving force and the vehicle braking force) is prevented from becoming excessive relative to the vehicle braking force as a second force. As a result, a situation does not occur in which the vehicle accelerates even though the driver is not performing an accelerating operation when, for example, the vehicle is traveling on an uphill grade, and the driver does not feel any discomfort.

Fourth Embodiment

A vehicle control device according to a fourth embodiment of the present invention (which is hereinafter referred to as "fourth control device") is next described. In the case of the first control device, when, for example, the vehicle is "traveling on an uphill grade," the "vehicle driving force" as a first force, which is greater than the vehicle braking force at the specific control termination time, is reduced preferentially to the vehicle braking force as a second force. Then, the first control device maintains the target wheel speed at the target wheel speed at the specific control termination time until the force that the driving source produces reaches a value corresponding to the amount of accelerating operation performed by the driver. Thus, the vehicle braking force as a second force is reduced with the reduction of the vehicle driving force.

On the contrary, the fourth control device reduces the "vehicle braking force" as a first force (the greater of the forces at the specific control termination time) preferentially to the vehicle driving force as a second force when, for example, the vehicle is "traveling on a downhill grade." Then, the fourth control device maintains the target vehicle speed at the target vehicle speed at the specific control termination time until the vehicle braking force reaches a value corresponding to the amount of braking operation performed by the driver. Thus, the vehicle driving force as a second force is reduced with the reduction of the vehicle braking force. The fourth control device is different from the first control device in that point.

More specifically, when the specific control termination time, at which the constant speed traveling control conditions are changed from satisfied state to unsatisfied state, comes while the driver is performing neither an accelerating operation nor a braking operation, the CPU of the fourth control device records (stores) the target vehicle speed TSV at the specific control termination time (=TSV0) and the output braking hydraulic pressures PwF at the specific control termination time (which are equal to the corresponding temporary braking hydraulic pressures PwC in this case) in the RAM and starts backup control.

In the backup control, the CPU gradually reduces the temporary braking hydraulic pressures PwC being applied to the wheel cylinders of the wheels to a value corresponding to the amount of braking operation performed by the driver so as to reduce the vehicle braking force. As a result, the output braking hydraulic pressures PwF are reduced toward a value corresponding to the amount of braking operation performed by the driver. In this case, since the driver is performing neither an accelerating operation nor a braking operation, "the value corresponding to the amount of braking operation performed by the driver" is "0."

Also, the CPU maintains the target vehicle speed TSV at the target vehicle speed TSV at the specific control termination time (=TSV0) until the temporary braking hydraulic pressures PwC to be applied to the wheel cylinders of the wheels (that is, the output braking hydraulic pressures PwF) reach a hydraulic pressure corresponding to the amount of braking operation performed by the driver, i.e. "0," and continues the constant speed traveling control. As a result, the vehicle speed SPD increases with decrease in the output braking hydraulic pressures PwF (decrease in the vehicle braking force). Therefore, the CPU reduces the output torque the engine 21 produces by reducing the driving force request value EGReqTq so as to maintain the vehicle speed SPD at the target vehicle speed TSV (=TSV0).

In addition, when the temporary braking hydraulic pressures PwC (that is, the output braking hydraulic pressures PwF) reach "0," the CPU reduces the vehicle driving force reliably by reducing the target vehicle speed TSV.

According to the fourth control device of the present invention constituted as described above, the target vehicle speed TSV is maintained at the target vehicle speed TSV at the specific control termination time (=TSV0) until the temporary braking hydraulic pressures PwC (that is, the output braking hydraulic pressures PwF) reach "0." Therefore, the driving force request value is reduced so that the vehicle speed SPD does not fall much below the vehicle speed SPD at the specific control termination time. In other words, the vehicle driving force is reduced to a vehicle driving force corresponding to the amount of accelerating operation performed by the driver, i.e. "0," so that the value of "the vehicle propulsive force" in the same direction as the vehicle braking force does not exceed the value of "the vehicle propulsive force at the specific control termination time" in the same direction as the vehicle braking force.

As described above, according to the fourth embodiment of the present invention, when the specific control termination time comes, the vehicle braking force as a first force, which is the greater of the vehicle driving force and the vehicle braking force at the specific control termination time, is changed toward the vehicle braking force corresponding to the amount of braking operation performed by the driver. Then, the vehicle driving force is reduced to a force corresponding to the amount of accelerating operation performed by the driver after the specific control termination time so that "the value of the vehicle propulsive force," which takes a positive value when acting in the same direction as the vehicle braking force and takes a negative value when acting in the opposite direction of the vehicle braking force and which has a magnitude equal to a value resulting from subtracting the magnitude of vehicle driving force from the vehicle braking force, will be equal to or smaller than the "the value of the vehicle propulsive force at the specific control termination time."

In other words, the vehicle braking force as the first force can be prevented from becoming excessive relative to the vehicle driving force as the second force. As a result, a situation does not occur in which the vehicle decelerates even though the driver is not performing a braking operation when, for example, the vehicle is traveling on a downhill grade, and the driver does not feel any discomfort.

The present invention is not limited to the embodiments and modification described above, and various modifications can be employed within the scope of the present invention.

While the master cylinder 32 generates the master cylinder pressure Pm as a normal time braking hydraulic pressure PwN in each of the above embodiments, the hydraulic pressure circuit 33 may generate a normal time braking hydraulic pressure PwN in proportion to (equal to) a master cylinder pressure Pm in response to a command from the electronic control device 50 output based on a master cylinder pressure Pm detected.

In each of the above embodiments, the electronic control device 50 may further include a driving force estimation device that estimates a vehicle driving force from the output driving force request value and a vehicle braking force estimation device that estimates a vehicle braking force from the output braking hydraulic pressures. In addition, the electronic control device 50 may further include a vehicle propulsive direction determination device that determines which of the vehicle driving force and the vehicle braking is greater and to be selected as the first force by comparing an estimated vehicle driving force and an estimated vehicle braking force.

In this case, the electronic control device 50 may be configured to perform the operation of one of the first embodiment, second embodiment and third embodiment when the first force determined by the vehicle propulsive direction determination device at the specific control termination time is the vehicle driving force.

Also, the electronic control device 50 may be configured to control the vehicle driving force and the vehicle braking force as in the fourth embodiment or as described below when the first force determined by the vehicle propulsive direction determination device at the specific control termination time is the vehicle braking force. The electronic control device 50 reduces the braking hydraulic pressures to a value corresponding to the amount of braking operation performed by the driver, i.e. "0," after the specific control termination time. The electronic control device 50 maintains the driving force request value at the driving force request value at the specific control termination time from the specific control termination time to a time when the braking hydraulic pressures reach "0." The electronic control device 50 reduces the driving force request value toward a value corresponding to the amount of accelerating operation performed by the driver, i.e. "0," after the time when the braking hydraulic pressures reach "0."

Also, the electronic control device 50 may be configured to reduce the vehicle braking force as the first force (the larger force) at a first reduction rate and reduce the vehicle driving force as a second force at a second reduction rate which is always lower than the first reduction rate when the first force determined by the vehicle propulsive direction determination device at the specific control termination time is the vehicle braking force.

In addition, the vehicle propulsive direction determination device may be configured to determine which of the vehicle driving force and the vehicle braking force is the first force, which is the larger of the two forces, based on the tilt G detected by the tilt sensor 44 at the specific control termination time.

In addition, the electronic control device 50, which acquires the tilt G based on a signal from the tilt sensor 44 in each of the above embodiments, may acquire the tilt G based on a signal from an acceleration sensor which detects the acceleration in the longitudinal direction of the vehicle.

In addition, the vehicle 10, which is a four-wheel-drive vehicle provided with a transfer in each of the above embodiments, may be a front-wheel-drive vehicle or a rear-wheel-drive vehicle. Also, the driving source may be an electric motor instead of an engine (internal combustion engine). That is, the vehicle control device according to the present invention is applicable to any vehicle equipped with a driving source which produces a force corresponding to a driving force request value to apply a vehicle driving force to the vehicle to increase the vehicle speed and a brake system which produces a force corresponding to a braking force control amount so as to apply a vehicle braking force to the vehicle to reduce the vehicle speed.

What is claimed is:

1. A vehicle control device for a vehicle equipped with a driving source that produces a force corresponding to a driving force request value so as to apply a vehicle driving force to the vehicle to increase a vehicle speed, and a brake system that produces a force corresponding to a braking force control amount so as to apply a vehicle braking force to the vehicle to reduce the vehicle speed, the control device comprising:

a first driving force request value generation device that generates a first driving force request value based on an accelerating operation amount which is varied by an accelerating operation of a driver;

a second driving force request value generation device that generates a second driving force request value based on a value corresponding to an actual vehicle speed and a value corresponding to a predetermined target vehicle speed so that the actual vehicle speed is equal to the target vehicle speed;

a first braking force control amount generation device that generates a first braking force control amount based on a braking operation amount which is varied by a braking operation of the driver;

a second braking force control amount generation device that generates a second braking force control amount based on the value corresponding to the actual vehicle speed and the value corresponding to the target vehicle speed so that the actual vehicle speed is equal to the target vehicle speed; and a vehicle propulsive force control device that causes the driving source to produce a force corresponding to the second driving force request value and causes the brake system to produce a force corresponding to the second braking force control amount when constant speed traveling control conditions necessary to make the actual vehicle speed equal to the target vehicle speed are satisfied, and that causes the driving source to produce a force corresponding to the first driving force request value and causes the brake system to produce a force corresponding to the first braking force control amount when the constant speed traveling control conditions are not satisfied;

wherein the vehicle propulsive force control device includes: a first control termination time control device that, when a specific control termination time at which the constant speed traveling control conditions are changed from a satisfied state to an unsatisfied state comes while neither the accelerating operation nor the braking operation are performed, changes a first force, which is the greater of the vehicle driving force and the vehicle braking force at the specific control termination time, toward one of a vehicle driving force resulting from a force that the driving source produces in accordance with the first driving force request value and a vehicle braking force resulting from a force that the brake system produces in accordance with the first braking force control amount that corresponds to the first force after the specific control termination time; and a second control termination time control device that changes a second force, which is the smaller of the vehicle driving force and the vehicle braking force, toward one of the vehicle driving force resulting from a force that the driving source produces in accordance with the first driving force request value and the vehicle braking force resulting from a force that the brake system produces in accordance with the first braking, force control amount that corresponds to the second force after the specific control termination time so that a value of a vehicle propulsive force, which takes a positive value when acting in the same direction as the first force and takes a negative value when acting in the opposite direction of the first force and which has a magnitude equal to a value resulting from subtracting a magnitude of the second force from a magnitude of the first force, is equal to or smaller than the value of the vehicle propulsive force at the specific control termination time.

2. The vehicle control device according to claim 1, further comprising: a driving force estimation device that estimates a vehicle driving force from the first driving force request value; and a vehicle braking force estimation device that estimates a vehicle braking force from the first braking force control amount.

3. The vehicle control device according to claim 2, further comprising a vehicle propulsive direction determination device that determines which of the vehicle driving force and the vehicle braking force is the first force, which is the greater of the two forces, by comparing the estimated vehicle driving force and the estimated vehicle braking force.

4. The vehicle control device according to claim 3, wherein the vehicle propulsive direction determination device determines which of the vehicle driving force and the vehicle braking force is the first force, which is the greater of the two forces at the specific control termination time, based on a tilt detected by a tilt sensor.

5. The vehicle control device according to claim 1, wherein the first control termination time control device is a driving force change device that changes the force that the driving source produces so as to change the vehicle driving force as the first force, and the second control termination time control device is a braking force change device that changes the force that the brake system produces so as to change the vehicle braking force as the second force.

6. The vehicle control device according to claim 5, wherein the braking force change device maintains the value corresponding to the target vehicle speed at the value corresponding to the target vehicle speed at the specific control termination time until the force that the driving source produces is changed to a force corresponding to the first driving force request value by the driving force change device, and changes the vehicle braking force by causing the brake system to produce a force corresponding to the second braking force control amount generated by the second braking force control amount generation device so that the value of the vehicle propulsive force after the specific control termination time is equal to or smaller than the value of the vehicle propulsive force at the specific control termination time.

7. The vehicle control device according to claim 5, wherein the braking force change device maintains the force that the brake system produces at the force that the brake system is producing at the specific control termination time until the force that the driving source produces is changed to the force corresponding to the first driving force request value by the driving force change device, and reduces the force that the brake system produces toward the force corresponding to the first braking force control amount after the force that the driving source produces reaches the force corresponding to the first driving force request value.

8. The vehicle control device according to claim 5, wherein the driving force change device gradually reduces the force that the driving source produces toward the force corresponding to the first driving force request value after the specific control termination time in such a manner that a reduction rate of the vehicle driving force is equal to a predetermined driving force reduction rate, and the braking force change device gradually reduces the force that the brake system produces toward the force corresponding to the first braking force control amount after the specific control termination time in such a manner that a reduction rate of the vehicle braking force is equal to a braking force reduction rate which is always lower than the driving force reduction rate.

9. The vehicle control device according to claim 1, wherein the first control termination time control device is a braking force change device that changes the force that the brake system produces so as to change the vehicle braking force as the first force, and the second control termination time control device is a driving force change device that changes the force that the driving source produces so as to change the vehicle driving force as the second force.

10. The vehicle control device according to claim 9, wherein the vehicle braking force as the first force is reduced preferentially to the vehicle driving force as the second force, the target vehicle speed is maintained at the target vehicle speed at the specific control termination time until the vehicle braking force reaches a value corresponding to the amount of braking operation performed by the driver, and the vehicle driving force as the second force is reduced with the reduction of the vehicle braking force.

11. The vehicle control device according to claim 9, further comprising a vehicle propulsive direction determination device that determines which of the vehicle driving force and the vehicle braking force is the first force, which is the greater of the two forces, by comparing the estimated vehicle driving force and the estimated vehicle braking force, wherein, when the first force determined by the vehicle propulsive direction determination device at the specific control termination time is the vehicle braking force, the braking force change device reduces the vehicle braking force at a first reduction rate and reduces the vehicle driving force as the second force at a second reduction rate which is always lower than the first reduction rate.

12. A vehicle control method for a vehicle equipped with a driving source that produces a force corresponding to a driving force request value so as to apply a vehicle driving force to the vehicle to increase a vehicle speed, and a brake system that produces a force corresponding to a braking force control amount so as to apply a vehicle braking force to the vehicle to reduce the vehicle speed, the control method comprising:

generating a first driving force request value based on an accelerating operation amount which is varied by an accelerating operation of a driver;

generating a second driving force request value based on a value corresponding to an actual vehicle speed and a value corresponding to a predetermined target vehicle speed so that the actual vehicle speed is equal to the target vehicle speed;

generating a first braking force control amount based on a braking operation amount which is varied by a braking operation of the driver;

generating a second braking force control amount based on a value corresponding to the actual vehicle speed and a value corresponding to the target vehicle speed so that the actual vehicle speed is equal to the target vehicle speed;

causing the driving source to produce a force corresponding to the second driving force request value and causing the brake system to produce a force corresponding to the second braking force control amount when constant speed traveling control conditions necessary to make the actual vehicle speed equal to the target vehicle speed are satisfied, and causing the driving source to produce a force corresponding to the first driving force request value and causing the brake system to produce a force corresponding to the first braking force control amount when the constant speed traveling control conditions are not satisfied;

changing, when a specific control termination time at which the constant speed traveling control conditions are changed from a satisfied state to an unsatisfied state comes while neither the accelerating operation nor the braking operation are performed, a first force, which is the greater of the vehicle driving force and the vehicle braking force at the specific control termination time, toward one of a vehicle driving force resulting from a force that the driving source produces in accordance with the first driving force request value and a vehicle braking force resulting from a force that the brake system produces in accordance with the first braking force control amount that corresponds to the first force after the specific control termination time; and changing a second force, which is the smaller of the vehicle driving force and the vehicle braking force, toward one of the vehicle driving force resulting from a force that the driving source produces in accordance with the first driving force request value and the vehicle braking force resulting from a force that the brake system produces in accordance with the first braking force control amount that corresponds to the second force after the specific control termination time so that a value of a vehicle propulsive force, which takes a positive value when acting in the same direction as the first force and takes a negative value when acting in the opposite direction of the first force and which has a magnitude equal to a value resulting from subtracting a magnitude of the second force from a magnitude of the first force, is equal to or smaller than the value of the vehicle propulsive force at the specific control termination time.

13. The vehicle control method according to claim 12, further comprising:
estimating a vehicle driving force from the first driving force request value; and
estimating a vehicle braking force from the first braking force control amount.

14. The vehicle control method according to claim 13, further comprising:
determining which of the vehicle driving force and the vehicle braking force is the first force, which is the greater of the two forces, by comparing the estimated vehicle driving force and the estimated vehicle braking force.

15. The vehicle control method according to claim 14, wherein it is determined which of the vehicle driving force and the vehicle braking force is the first force, which is the greater of the two forces at the specific control termination time, based on a tilt detected by a tilt sensor.

16. The vehicle control method according to claim 12, wherein the force that the driving source produces is changed so as to change the vehicle driving force as the first force, and the force that the brake system produces is changed so as to change the vehicle braking force as the second force.

17. The vehicle control method according to claim 16, wherein the value corresponding to the target vehicle speed is maintained at the value corresponding to the target vehicle speed at the specific control termination time until the force that the driving source produces is changed to a force corresponding to the first driving force request value, and the vehicle braking force is changed by causing the brake system to produce a force corresponding to the second braking force control amount generated so that the value of the vehicle propulsive force after the specific control termination time is equal to or smaller than the value of the vehicle propulsive force at the specific control termination time.

18. The vehicle control method according to claim 16, wherein the force that the brake system produces is maintained at the force that the brake system is producing at the specific control termination time until the force that the driving source produces is changed to the force corresponding to the first driving force request value, and is reduced toward the force corresponding to the first braking force control amount after the force that the driving source produces reaches the force corresponding to the first driving force request value.

19. The vehicle control method according to claim 16, wherein the force that the driving source produces is gradually reduced toward the force corresponding to the first driving force request value after the specific control termination time in such a manner that a reduction rate of the vehicle driving force is equal to a predetermined driving force reduction rate, and the force that the brake system produces is gradually reduced toward the force corresponding to the first braking force control amount after the specific control termination time in such a manner that a reduction rate of the vehicle braking force is equal to a braking force reduction rate which is always lower than the driving force reduction rate.

20. The vehicle control method according to claim 12, wherein the force that the brake system produces is changed so as to change the vehicle braking force as the first force, and the force that the driving source produces is changed so as to change the vehicle driving force as the second force.

21. The vehicle control method according to claim 20, wherein the vehicle braking force as the first force is reduced preferentially to the vehicle driving force as the second force, the target vehicle speed is maintained at the target vehicle speed at the specific control termination time until the vehicle braking force reaches a value corresponding to the amount of braking operation performed by the driver, and the vehicle driving force as the second force is reduced with the reduction of the vehicle braking force.

22. The vehicle control method according to claim 20, further comprising:
determining which of the vehicle driving force and the vehicle braking force is the first force, which is the greater of the two forces, by comparing the estimated vehicle driving force and the estimated vehicle braking force, wherein, when the first force determined at the specific control termination time is the vehicle braking force, the vehicle braking force is reduced at a first reduction rate and the vehicle driving force as the second force is reduced at a second reduction rate which is always lower than the first reduction rate.

* * * * *